US008433617B2

(12) United States Patent
Goad et al.

(10) Patent No.: US 8,433,617 B2
(45) Date of Patent: Apr. 30, 2013

(54) SYSTEMS AND METHODS FOR IDENTIFYING THIRD PARTY PRODUCTS AND SERVICES AVAILABLE AT A GEOGRAPHIC LOCATION

(75) Inventors: Glenn R. Goad, Cumming, GA (US); Neil J. Singer, Milton, GA (US); David N. Martin, Atlanta, GA (US); Ryan J. Chapple, Tyrone, GA (US); Earl D. Baugh, Jr., Alpharetta, GA (US)

(73) Assignee: Allconnect, Inc., Atlanta, GA (US)

( * ) Notice: Subject to any disclaimer, the term of this patent is extended or adjusted under 35 U.S.C. 154(b) by 183 days.

(21) Appl. No.: 12/754,930

(22) Filed: Apr. 6, 2010

(65) Prior Publication Data
US 2011/0137745 A1    Jun. 9, 2011

Related U.S. Application Data

(63) Continuation-in-part of application No. 12/634,345, filed on Dec. 9, 2009, now Pat. No. 8,346,624.

(51) Int. Cl.
*G06Q 30/00* (2006.01)

(52) U.S. Cl.
USPC ........................ 705/26.41; 705/26.7; 705/27.1

(58) Field of Classification Search .................... 705/26, 705/27
See application file for complete search history.

(56) References Cited

U.S. PATENT DOCUMENTS

| | | | |
|---|---|---|---|
| 6,012,051 A | 1/2000 | Sammon, Jr. et al. | |
| 6,965,872 B1 | 11/2005 | Grdina | |
| 6,985,939 B2 | 1/2006 | Fletcher et al. | |
| 7,076,447 B1 | 7/2006 | Peyser et al. | |
| 7,287,002 B1 | 10/2007 | Asher et al. | |
| 7,302,429 B1 | 11/2007 | Wanker | |
| 7,430,531 B1 | 9/2008 | Snyder | |
| 2001/0044743 A1 | 11/2001 | McKinley et al. | |
| 2002/0116282 A1 | 8/2002 | Martin et al. | |
| 2004/0015405 A1 | 1/2004 | Cloutier et al. | |
| 2004/0064379 A1 | 4/2004 | Anderson et al. | |
| 2004/0220918 A1* | 11/2004 | Scriffignano et al. ............ 707/3 |
| 2004/0221305 A1 | 11/2004 | Broussard et al. | |

(Continued)

OTHER PUBLICATIONS

Allconnect: Intenet Archive Wayback Machine, www.archive.org; www.allconnect.com; Oct. 2008, 30pgs.*

(Continued)

*Primary Examiner* — Robert M. Pond
(74) *Attorney, Agent, or Firm* — Morris, Manning & Martin, LLP; John R. Harris, Esq.; Daniel E. Sineway, Esq.

(57) ABSTRACT

Systems and methods for identifying third party products and services available to geographic location. Generally, the system identifies a subject address or location at which services are desired. Next, the system parses, standardizes, and verifies the subject address as a valid physical location. Then, the system identifies relevant market(s) corresponding to the subject address, and determines product and service offerings in the relevant market(s). Further, the system determines capabilities required to effectuate the determined service offerings at the location, and identifies capabilities available at the geographic location. Subsequently, the system compares the required capabilities of the services to the available capabilities at the location to generate serviceability information corresponding to services actually available at the location. Finally, the system provides the serviceability information to a user for selection of particular products and services, or stores the information for further processing within the system.

36 Claims, 14 Drawing Sheets

EXEMPLARY ADDRESS DETERMINATION PROCESS

U.S. PATENT DOCUMENTS

| | | |
|---|---|---|
| 2005/0114155 A1 | 5/2005 | Hodges et al. |
| 2006/0282304 A1 | 12/2006 | Bedard et al. |
| 2008/0262897 A1 | 10/2008 | Howarter et al. |
| 2008/0270224 A1 | 10/2008 | Portman et al. |

OTHER PUBLICATIONS

Tribble, Sarah Jane; "TV, Phone, Internet: Choosing a Provider of all three," The New York Times, Oct. 16, 2008, 3pgs.*

Bridgevine.com home page; Internet Archive Wayback Machine, www.archive.org, www.bridgevine.com; Jun. 5, 2009, 2pg.*

Bundlemyservices.com home page; Internet Archive Wayback Machine, www.archive.org, www.bundlemyservices.com; May 20, 2009, 3pgs.*

Digitallanding.com home page; Internet Archive Wayback Machine, www.archive.org, www.digitallanding.com; Nov. 17, 2009, 2pgs.*

* cited by examiner

FIG. 1 OVERVIEW OF ORDER FACILITATION AND RECOMMENDATION SYSTEM

EXEMPLARY ORDER FACILITATION AND RECOMMENDATION PROCESS

```
                                                    ┌─ 300
Welcome to XYZ Facilitation Service

PLEASE ENTER USER NAME   [        ]
PLEASE ENTER PASSWORD    [        ]
```

FIG. 3

EXEMPLARY LOG-IN SCREEN

```
                                                    ┌─ 400
Location Information Request PLEASE ENTER ADDRESS WHERE SERVICE IS REQUIRED
[                                              ]

STATE    [        ]
ZIP CODE [        ]
```

FIG. 4

EXEMPLARY LOCATION IDENTIFICATION SCREEN

SERVICES AVAILABLE AT ADDRESS-B

| 500 |
|---|
| ELECTRICITY |
| INTERNET |
| LOCAL TELEPHONE |
| LONG DISTANCE TELEPHONE |
| CABLE CONNECTION |
| HIGH-SPEED INTERNET |
| INSURANCE |
| PACKERS AND MOVERS |
| MAID SERVICES |
| DRY CLEANING |
| NEWSPAPER DELIVERY |

WHICH SERVICES ARE YOU INTERESTED IN?
(YOU CAN SELECT MULTIPLE SERVICES)

| | |
|---|---|
| ☒ | ELECTRICITY |
| ☒ | INTERNET |
| ☐ | LOCAL TELEPHONE |
| ☒ | LONG DISTANCE TELEPHONE |
| ☒ | CABLE CONNECTION |
| ☐ | HIGH-SPEED INTERNET |
| ☐ | INSURANCE |
| ☐ | PACKERS AND MOVERS |
| ☐ | MAID SERVICES |
| ☐ | DRY CLEANING |
| ☐ | NEWSPAPER DELIVERY |

*FIG. 5*

EXEMPLARY LISTING OF PRODUCTS OR SERVICES AVAILABLE AT A GIVEN LOCATION

| Bundle | Phone | TV | Internet | Others |
|---|---|---|---|---|

Recommended Products and Services for Address-B

Results Displayed For: 1100 GOLDEN HORSESHOE CIR APT M, MORRISVILLE NC 27560-7624

| Rank | Provider | Plan | Price |
|---|---|---|---|
| 61 | SunTV | Digital Programming | $0.00 |
| 39 | TVCorp | DIGIPIC | $71.95 |
| 34 | SunTV | Classic Programming | $0.00 |
| 27 | TVMedia | Standard Cable | $50.00 |
| 22 | TVMedia | Basic Cable | $14.95 |
| 21 | TVCorp | Local Cable | $0.00 |

Legend:
| GREEN |
| YELLOW |
| RED |
| GRAY |

*FIG. 6*

EXEMPLARY RANKED LIST OF PRODUCTS OR SERVICES

/— 700

TELCO SERVICE PLANS AVAILABLE AT ADDRESS-B

| SELECTION | SERVICE PROVIDER | SERVICE PLAN | MONTHLY PRICE | # PACKAGE FEATURES | PROMOTION |
|---|---|---|---|---|---|
| ☐ | TelCo | COMPLETE CHOICE W.... | $54.99 | 15 | SEE INFO PLAN |
| ☐ | TelCo | COMPLETE CHOICE - ... | $30.00 | 15 | SEE INFO PLAN |
| ☒ | TelCo | PREFERRED PACK W/U... | $47.99 | 5 | SEE INFO PLAN |
| ☐ | TelCo | PREFERRED PACK - NC | $26.00 | 5 | SEE INFO PLAN |
| ☐ | TelCo | UNLIMITED CALLING - ... | $16.75 | 0 | SEE INFO PLAN |
| ☐ | TelCo | AS IS | TRANSFER | N/A | N/A |

FIG. 7
EXEMPLARY LIST OF PRODUCT OR SERVICE PLANS

/— 800

PROVIDER INTEGRATION PAGE

DO YOU CURRENTLY HAVE A LOCAL PHONE SERVICE IN YOUR NAME? ● Yes ○ No

WHO IS YOUR CURRENT LOCAL PHONE SERVICE PROVIDER? [▼]

DO WE HAVE PERMISSION TO ACCESS YOUR RECORDS? ● Yes ○ No

WHAT IS YOUR CURRENT PHONE NUMBER? [   ]

FIG. 8
EXEMPLARY PROVIDER INTEGRATION PAGE

*900*

ORDER SUMMARY

[33349750] LOCAL TELCO PREFERRED PACK

RECAPPED ORDER ITEMS

*COST SUMMARY*
TOTAL INSTALL COST     $42.75
TOTAL MONTHLY COST     $29.00

RECAP TEXT THERE IS AN ADDITIONAL FCC CHARGE OF $6.50 ON THE MAIN LINE AND $7.00 ON ADDITIONAL LINES. OTHER STATE AND LOCAL TAXES MAY APPLY

RECAPPED PLAN ATTRIBUTES

*PLAN ATTRIBUTES*
BASE MONTHLY PRICE     $26.00
SET UP FEE – 1$^{ST}$ LINE     $42.75

| | |
|---|---|
| PLAN OPTIONS CALL WAITING DELUXE | INCLUDED |
| CALLER ID W/NAME AND NUMBER | INCLUDED |
| PRIVACY SERVICE | INCLUDED |
| THREE WAY CALLING | INCLUDED |
| CALL RETURN/AUTO CALL RETURN | INCLUDED |

FIG. 9
EXEMPLARY ORDER SUMMARY PAGE

EXEMPLARY SERVICEABILITY ENGINE ARCHITECTURE

EXEMPLARY ADDRESS DATABASE SCHEMA

EXEMPLARY MARKET DATABASE SCHEMA

EXEMPLARY MARKET ITEM DATABASE SCHEMA

EXEMPLARY CAPABILITIES DATABASE SCHEMA

EXEMPLARY SERVICEABILITY PROCESS

EXEMPLARY ADDRESS DETERMINATION PROCESS

SYSTEMS AND METHODS FOR IDENTIFYING THIRD PARTY PRODUCTS AND SERVICES AVAILABLE AT A GEOGRAPHIC LOCATION

CROSS REFERENCE TO RELATED APPLICATION

This application is a continuation-in-part and claims priority to and benefit of U.S. patent application Ser. No. 12/634,345, filed Dec. 9, 2009, entitled "Systems and Methods for Recommending Third Party Products and Services", by Glenn R. Goad et al., which is hereby incorporated by reference.

TECHNICAL FIELD

The present disclosure relates generally to the acquisition of products and services, and more particularly to determining and providing third party product and service "serviceability information" for use in conjunction with the electronic acquisition of third party products and services.

BACKGROUND

Residents of any property typically utilize multiple third party utility services or products at the property such as electricity, water, waste-disposal, Internet, television, cable, home security, home warranty, telephone services, and a variety of other products and services. These services are generally provided by a host of different service providers, each operating in different geographic locations, offering different types of products and services, offering different product or service plans at various prices, and each requiring different capabilities at resident locations. For example, a particular Internet service provider may only offer Internet service through a cable line. Thus, if a home within the service provider's coverage area utilizes satellite service, and is not pre-wired for a cable connection, the particular service provider's Internet service may not be available to the particular home. Or, for example, certain service providers may only offer their products and services to certain zip codes or regions of a given geographic area. As will be understood, each individual product or service provider may have its own restrictions and requirements regarding the types of products and services it offers to certain geographic areas.

It is often the case that a resident or homeowner requires new activation of a particular service or transfer of a service from one location to another, for example, during a move of one's residence or purchase of a new home. However, switching all of one's home services can be a daunting and cumbersome task. For example, if a given resident wishes to acquire electricity, television, Internet, home telephone, trash service, water, and home security services a the resident's location, the resident typically must contact each individual service provider, provide identifying information associated with the resident and his or her residence, determine whether the given service provider actually provides services to the resident's location, identify the best product or service plan offered by the provider that meets the resident's needs, comparison shop against other product or service providers (if desired), and purchase such products or services for the location. Clearly, this can be a time-consuming and frustrating process for the resident.

To address this concern, some residents utilize a facilitation service to assist them in securing various third party products and services. A facilitation service generally interacts with a plurality of product and service providers to aggregate information for residents and provide "one-stop-shopping" for necessary products and services. However, the facilitation service faces similar challenges to those of the resident when it comes to identifying which products and services are available at a given geographic location. For example, resident addresses may be provided (by residents or other information sources) in varying formats, making it difficult to uniformly identify specific addresses that require service. Further, maintaining up-to-date information relating to product and service plans offered by each individual service provider, and the particular requirements (e.g., coaxial cable required, septic system not allowed, etc.) of each, can be challenging. Also, efficiently identifying the capabilities at each resident's location (e.g., existing home security system, satellite connection, etc.) often requires extensive question and answer sessions with the resident, which reduces the overall efficiency and productivity of the facilitation service and causes customer frustration.

Therefore, there exists a long-felt but unresolved need for a system or method that interacts with a user to combine and analyze various sources of disparate information relating to third party products and services offered at a user's address or geographic location, and suggest optimal products or services to the user based on the collected information to enable the user to select, purchase, and/or transfer the most appropriate product(s) or service(s) that fit his or her needs. There is a further need for a system or method that identifies particular products and services available to a user at the user's location based on the specifics of the user's particular location, the requirements of various products and services, and other user-specific information.

BRIEF SUMMARY

Briefly described, and according to one embodiment, the present disclosure describes a computer-implemented method for providing serviceability information to a user. Initially, service address information is obtained and verified. Next, the method determines third party service providers that provide one or more services in a market segment determined based on the verified service address, and retrieves information regarding the services provided by a particular third party service provider in the market segment. Further, the method fetches product capabilities required for the particular third party service; and address capabilities available at the service address. Finally, a list of third party services available at the service address is displayed based on an analysis of available third party services, and a match between the product capabilities required for a particular third party service and the address capabilities available at the service address.

Another embodiment of the present disclosure presents a system for providing serviceability information about multiple third party service providers to a user. The system includes a processor, a network interface for communication with users and the third party service providers, and a memory. The memory further includes an input module for obtaining service address information, and an address verification module for verifying the service address information. Further, a market identifier determines third party service providers that provide one or more services in a market segment determined based on the service address. Moreover, the memory includes an item identifier for retrieving information regarding the services provided by a particular third party service provider in the market segment, and product capabilities required by the retrieved services. A serviceability broker fetches address capabilities available at the service address, while a serviceability matcher provides serviceability information at the service address based on an analysis of third party services available in the market segment, and a match between the product capabilities required for a particular third party service and the address capabilities available at the service address.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel disclosure concepts.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. The drawings are illustrative in nature and are not necessarily drawn to scale.

FIG. 3 illustrates an exemplary user identification screen according to an embodiment of the present system.

FIG. 4 illustrates an exemplary user information retrieval screen according to an embodiment of the present system.

FIG. 5 illustrates an exemplary listing of products and services available at a given address according to an embodiment of the present system.

FIG. 6 is a screenshot of an exemplary list of ordered recommendations for products and services suggested to a user for use at the user's address according to an embodiment of the present system.

FIG. 7 illustrates an exemplary list of available service types at a geographical location according to an embodiment of the present system.

FIG. 8 illustrates an exemplary provider integration page according to an embodiment of the present system.

FIG. 9 illustrates an exemplary acquisition summary report listing products and/or services purchased by a user of an embodiment of the present system.

DETAILED DESCRIPTION

Figure 1:
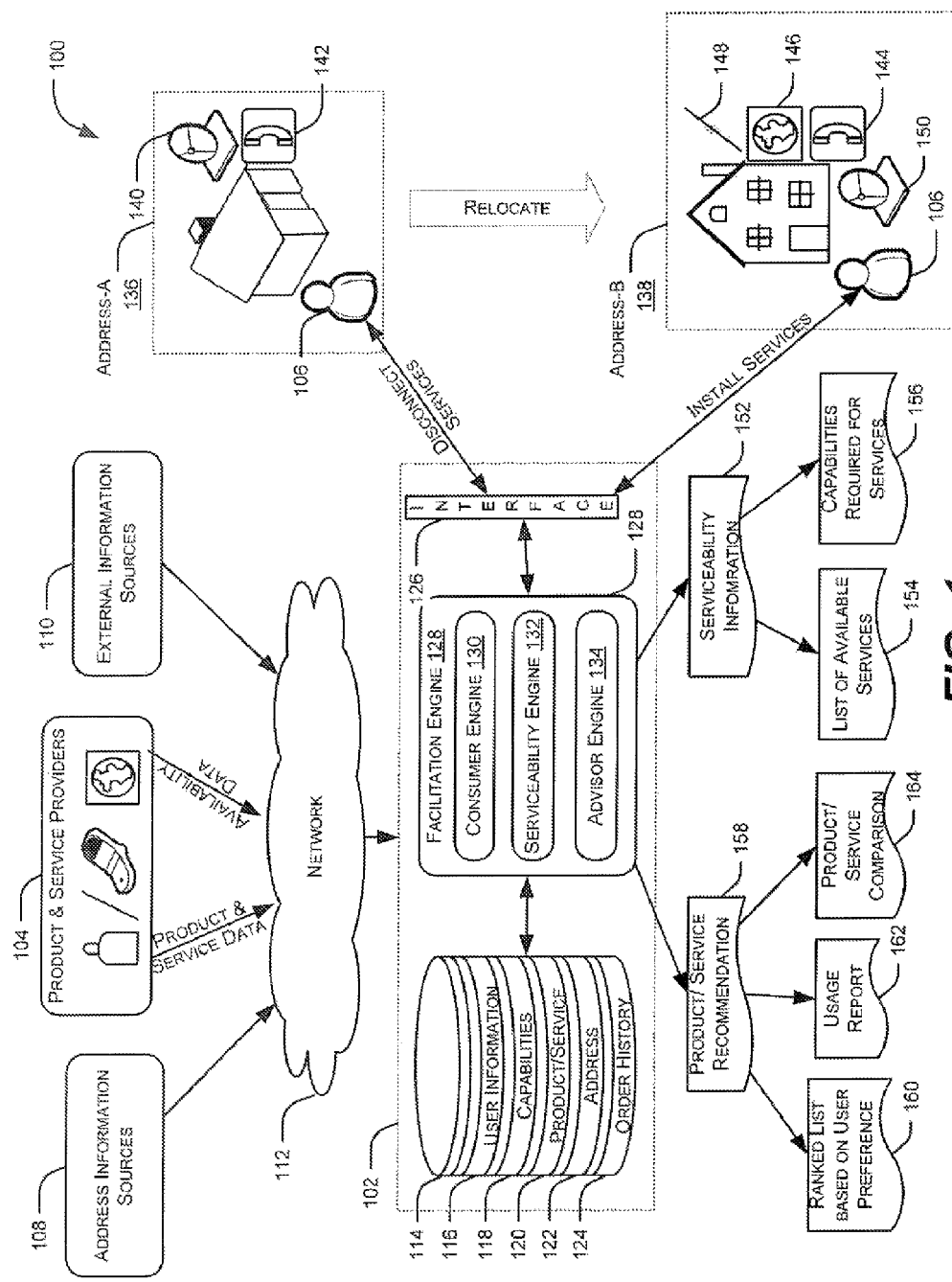
FIG. 1 is a block diagram illustrating an exemplary system for electronic acquisition of products and services provided by an embodiment of an order facilitation service.

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Definitions/Glossary

Address Verification Module: algorithm, software module, processor, or other system component that compares a processed, standardized address of a system user with a database of known addresses to confirm the standardized address.

Capabilities: for product and service providers, the requirements and/or physical criteria required to effectuate a given service at a particular address location. Examples include specific connections (e.g., cable, telephone, etc.), specific hardware (e.g., satellite dish, high-speed modem, security system, etc.), specific associated services (e.g., on recycling pickup route), and other similar requirements. For a user's address or geographic location, capabilities comprise the available connections, hardware, or other facilities/functionality available at the address to receive products and/or services.

Input Module: algorithm, software module, processor, or other system component that receives address or location information of a user.

Market: a grouping or designation that corresponds to common serviceability criteria of products or services available in that market. Examples include geographic designations, service type designations, service provider designations, combinations of designations, and other similar groupings. Generally synonymous with market segment.

Market Identifier: algorithm, software module, processor, or other system component that identifies relevant market(s) associated with a given address or geographic location based on geographic or capabilities information corresponding to the given address or geographic location.

Order Facilitation System: a system constructed as described in this document, that facilitates ordering by users of third party products and services, preferably offered to a geographic location. Generally synonymous with order facilitation service, facilitation system, facilitation service, and facilitation engine.

Parser: algorithm, software module, processor, or other system component that analyzes received address information of a user and breaks the information into discrete components for further processing and identification.

Product and/or Service Provider: an entity, company, or person that provides products and/or services to a user at the user's geographic location or address.

Serviceability: determination of particular product and service providers that provide services to a given geographic location, the specific products and services offered to the location by those product and service providers, and capability of the given location to accept or utilize the specific products and services.

Serviceability Broker: algorithm, software module, processor, or other system component that retrieves capabilities information associated with a given address or geographic location, receives serviceability information of various products and services, and submits the information to a serviceability matcher for further processing. Also generally interacts with third party product and service providers to obtain real-time serviceability information.

Serviceability Engine: system component or module as described in this document, that determines particular products and service plans offered by particular product and service providers at a particular geographic location based on disparate sources of information. Generally synonymous with serviceability module.

Serviceability Information: data and information relating to the serviceability of particular products and services offered by particular product and service providers at a particular geographic location.

Serviceability Matcher: algorithm, software module, processor, or other system component that analyzes and compares capabilities available at an identified address or geographic location to required capabilities associated with products and/or services to determine products and/or services available at the identified address or geographic location.

Service Item Identifier: algorithm, software module, processor, or other system component that retrieves product and service information, and associated capabilities information, corresponding to a particular market segment.

Standardizer: algorithm, software module, processor, or other system component that organizes address information into a predefined, normalized format.

Third party products and/or services: products and/or services provided by a third party (e.g., utility provider) to the address or geographic location of a user. Generally include electricity, natural gas, satellite television, cable television, wireless telephone, landline telephone, Internet, home security, home insurance, home warranty, newspaper delivery, home cleaning service, moving service, dry-cleaning, trash pickup, pest control, and other similar products and services. Generally synonymous with products and/or services, products, services, and home services. As used herein, the terms "products" and "services" are considered synonymous and interchangeable.

User: a person or entity that utilizes embodiments of the presently-described systems and methods. Generally includes a resident of an address or geographic location, a customer service representative (CSR), or other similar user. Generally synonymous with resident, consumer, or customer.

System Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Embodiments of the present disclosure generally relate to aspects of an electronic (e.g., Internet-accessible) system (e.g., an order facilitation service) that facilitates acquisition and management of geographically-determined third party products and services to consumers. According to one embodiment, the system includes operative connections to a number of product and service providers, and coordinates and offers products and services of those product and service providers to users of the system. For example, if a user relocates his or her residence from Dallas to Atlanta, the user can access the electronic system (e.g., via the Internet, or via a phone call to a call center that accesses the electronic system) to arrange for disconnection of existing residential or business services such as telephone, cable TV, satellite TV, Internet, trash pickup, security, electricity, gas, pest control, other utilities, and so on, and reconnection of similar services in Atlanta. Alternatively, if a user simply wishes to add a new product or service to his or her existing location, or change an existing service, he or she can do so via the electronic order facilitation system. In this way, a user is able to transfer existing products and services, order new products and services, or cancel products and services offered by a plurality of different product and service providers from one central facilitation system (described in greater detail below).

Further, according to one aspect, the electronic order facilitation system includes a serviceability engine that determines particular product and service plans offered by particular product and service providers at a particular geographic location based on disparate sources of information. Specifically, the system includes operative connections to service provider systems and other external data sources (e.g., tax records, U.S. Postal Service, census data, user-entered data) that enables the serviceability engine to identify products and services available to a given geographic location based on specifics associated with the service providers (e.g., only provides service in Atlanta), capability requirements associated with the products and services (e.g., requires recycling pickup service), and capabilities available at the given geographic location (e.g., existing satellite connection). The serviceability engine also parses and normalizes disparate address information to enable efficient processing of that information and accurate retrieval of available products and services. According to one aspect, the products and services that are determined to be available at a given location are used as a baseline input by the facilitation system to determine the most optimal products and services for a given user based on the user's preferences, demographics, affordability of the services, etc. As used herein, "serviceability" refers to determination of particular product and service providers that provide services to a given geographic location, the specific products and services offered to the location by those product and service providers, and capability of the given location to accept or utilize the specific products and services.

According to an additional aspect, the electronic order facilitation system provides a user management system and/or portal that enables each user to manage all or many of his or her third party products and services from one electronic platform. Specifically, the system includes operative connections to service provider systems so as to track customer usage of various third party products and services. This usage information is utilized to provide the user via the user management system with a consolidated view of the user's products and services and enable the user to track usage and expense of the services, compare the expense to predetermined budget amounts, compare the usage to other users locally and nationally, etc. Additionally, the user management system provides alerts to the users (e.g., via email, mobile phone, text (SMS) message, etc.) when certain usage or expenditure thresholds are reached (e.g., mobile phone minutes overage, pay-per-view movie orders, etc.), when payments become due, or when new offers, deals, or service promotions become available, etc. Further, the system allows for consolidated bill payment from one convenient location.

According to another aspect, the electronic order facilitation system receives data from a variety of different sources (e.g., publicly-available census data, product and service data provided by product and service providers, stored data based on previous user orders, user-entered data, etc.), and analyzes that data according to predetermined rules, factors, etc., to provide a user with rankings or suggestions of optimal product and service offerings that are tailored to the specific user's needs and preferences. For example, based on a given user's mobile phone plan with service provider X, the system may identify a new plan offered by service provider Y that is less expensive than the user's current plan, but includes all of the same features as the current plan. Accordingly, the system may provide a suggestion to the user to switch plans to the new plan offered by provider Y. This recommendation may be provided via an alert, or simply displayed on the user's portal for viewing the next time the user logs in to the system, or may be presented to the user via a call center representative during a move of the user's residence, etc. Correspondingly, the present system provides a mechanism for enabling the user to automatically transfer his or her mobile phone service to the newly-offered plan. According to one aspect, the system automatically selects the most optimal or most appropriate (e.g., highest ranked) product or service for each product or service type of which the user is interested, and suggests or automatically populates a user's order with the selected products or services.

According to a further aspect, over time as users order numerous products and services via the electronic system (or do not order suggested products or services), the system stores information relating to those orders (or non-orders), and subsequently provides that order history information to third party product and service providers for further use. Specifically, and for example, the electronic order facilitation service may provide order history information, user preference information, product or service rankings, popularity information of certain products or services, and other similar types of information to the third party service providers, enabling the providers to analyze their products and services based on the received information to improve the quality of their products and services, sales, and profit margins. For example, in one geographical location such as Atlanta, the electronic system may determine that most users prefer Telco's Internet service as a result of cost benefits offered and because Telco provides excellent customer support service. Other Internet service providers can analyze Telco's service plans along with their own service plans to optimize their plans for better customer satisfaction, and in turn higher sales.

Described immediately below is an overview of one embodiment of the order facilitation system for facilitating the ordering, ranking, and recommendation of third party products and services offered to consumers. Thereafter, the "Exemplary Serviceability Engine" section (and the sections that follow) describe the functionality of at least one embodiment of a serviceability engine within the order facilitation system for accurately determining addresses associated with geographic locations, normalizing address information to enable uniform processing, identifying data from third party service providers and aggregating/maintaining that data, associating particular predefined markets with the identified product and service data, determining capabilities required for each product and service, identifying the capabilities available at each geographic location, providing serviceability information for particular products and services as they relate to particular geographic locations, and a host of other functions relating to the serviceability of products and services at given geographic locations.

Exemplary Product and Service Ordering System

Turning now to the figures, FIG. 1 illustrates an embodiment of an electronic system 100 for recommending and facilitating the ordering of third party products and services provided to users (i.e., an order facilitation and recommendation service), as described in detail herein. As shown, the electronic system 100 includes a computing system 102 operatively coupled to one or more third party product and service provider(s) 104, user(s) 106, address or location information source(s) 108, and other external information source(s) 110 through a network (e.g., Internet) 112. Although not specifically shown, it will be understood by one of ordinary skill in the art that, according to one embodiment, users 106 access the computing system 102 via the network 112, or via a call center, etc. For purposes of the present disclosure, the term "user" is generally synonymous with "customer" or "consumer".

As shown, the computing system 102 maintains one or more database(s) 114 that store information from the sources 104, 108, 110. The databases 114 may include a customer (or user) information database 116, a capabilities database 118, a products and services database 120, an address database 122, and an order history database 124. Generally, the computing system 102 retrieves information from the sources 104, 108, 110 and populates the retrieved information in the databases, based on system requirements. As will be understood, these databases may be updated in real time or on an intermittent basis. As will be further understood, the specific databases shown and described are intended to be illustrative only, and actual embodiments of the present system include various database structures, schemas, etc.

Depending on the particular embodiment, the network 112 may be the Internet, providing interaction capabilities between the various sources and the computing system 102, a private network (such as a VPN), a PSTN system (providing call center capabilities), a mobile phone network, or a combination of these networks. For example, the computing system 102 can have both Internet connectivity as well as call center capabilities to service users. Some users may prefer to use the Internet for service acquisition, while other users, who may not be as adept or familiar with the Internet, may prefer to use the call center facility (not shown). According to one embodiment, the call center employs customer service representatives (CSRs) that interact with the user, obtain information from the user, and provide information (e.g., suggested products and services) to the user to obtain the requested products and services and/or manage existing products and services.

The customer information database 116 generally includes information pertaining to each user 106, such as a user identification number, preferences and details associated with that user, the user's purchase history of products and services ordered through the computing system 102, current, future, and previous address information (if available), financial information (e.g., credit history), and other similar types of information. This information may be retrieved from a variety of sources, such as the user 106, previously stored information in the computing system 102, financial institutions, publicly available data sources, or other information sources known in the art. For example, a user's purchase history can be retrieved from the computing system 102 every time an order is placed via the order history database 124. Financial information, on the other hand, may be obtained from either the user 106, or some financial institutions. It will be understood that other information sources may also be used to obtain user related information—for example, census information can be utilized to gather information such as the number of family members, family income, and other user-related information.

The address database 122 may include extensive information about each user's address or addresses, or all of the physical addresses in a given geographic area. The information relating to the addresses stored in the address database 122 may include address characteristics (such as whether the location is a business address or a household, an apartment or a home, etc.), the size of the residence, the floor plan, the number of rooms, the size of a lot, or other similar information. The address information also may include information relating to the product and service capabilities at a given address, such as whether the address is pre-wired for certain types of services, includes pre-existing home security or satellite systems, is located on a recycling pickup route, etc. This information may be retrieved from the users 106 or the address information source(s) 108, such as real estate sources, city plans blueprints, census data, product or service providers, city authorities, tax records, or any other known sources.

Similarly, information pertaining to third party products and services is stored in the products and services database 120. This information may be directly retrieved from the third party product and service providers 104 or from other external information sources 110. For example, the products and services database 120 may include information about the products and services offered (e.g., prices of plans, plan specifics, features, etc.), geographical areas serviced, special offers or promotions from the service providers 104, types of hookups, connections, or other address capabilities required to utilize the service, and other similar information. Further, information such as product or service popularity, user ratings, order history of each product or service, product reviews, etc., may be stored in the products and services database 120, or may be retrieved from other external sources 110 or other system databases (e.g., the order history database 124) that store details of orders made through an embodiment of the computing system 102.

Still referring to FIG. 1, the capabilities database 118 uses information from the products and services database 120, the address database 122, the service providers 104, and the users 106 to build a cross-referenced database of various capabilities required for different products and services stored in the products and services database 120, and their potential for availability at the addresses in the address database 122. For example, if a certain Internet provider provides a DSL connection, then as an entry or data item for that service provider, the capabilities database 118 may store a "cable connection required" identifier. As a further example, if capability information is available for an address, the capabilities database 118 maintains a list of capabilities corresponding to that address, such as "telephone connection present," or "no gas connection". As recited previously, some or all of this information also may be stored in the address database 122, and thus the capabilities database can retrieve the information from there. Alternatively, certain products or services may not be available in certain areas, and thus the capabilities information for those products and services will indicate that those products and services cannot be ordered for those areas. Thus, each product or service, user address, etc., may be associated with predetermine rules or criteria that dictate an availability for a given product or service in a particular area or for a particular address. Further, as will be understood, this information may be updated on a real-time or intermittent basis from product or service providers 104 or other information sources 108, 110.

The capabilities information stored in the capabilities database 118 is useful to determine the most appropriate product or service for a user 106. For example, if a user's household already includes a telephone connection, it may be advisable to select an Internet service provider that provides telephone cable connection, rather than a service provider that provides only LAN-based connections. Or, if a home is pre-wired for a security system, then the facilitation system 100 can recommend that the user subscribe for home security service, as the initial installation cost associated with such service will be unnecessary. This capabilities information may be retrieved from address sources 108, service providers 104, from the users 106 directly, or from other sources as will occur to one of ordinary skill in the art.

Still referring to FIG. 1, in addition to the databases, one embodiment of the computing system 102 includes a user interface 126 and a facilitation engine or module 128. Generally, the user interface 126 comprises a graphical user interface (GUI) that allows users 106 to access the computing system 102, input information and details into the system regarding the user or the user's address (e.g., user preferences, address information, a customer identification number, etc.), and request, review, and order products and services. For example, if a user 106 desires to acquire an electricity connection at his or her home, the user interface 126 may display an ordered list of electricity connection providers, along with their service plans, based on analysis of disparate information. Additionally, one aspect of the user interface allows for management of services at the user's address, tracking of service costs and bills as compared to previous billing cycles or other users of the services in similar or different geographic areas, provision of helpful cost-savings or energy efficient service usage information, etc. According to one embodiment, rather than the user accessing the user interface 126 via the network 112, the user may contact a call center and a customer representative may assist the user in ordering various products and services (e.g., a user interface may be displayed to the call center representative). Example screen shots illustrating various user interface screens are shown in FIGS. 3-9.

According to one embodiment, the facilitation engine 128 includes an algorithm or other system components that enable a user to review, transfer, cancel, purchase, track usage and expense of, or otherwise manage third party products and services. Generally, the facilitation module 128 interacts with databases 114 and other information sources (described herein and as will occur to one of ordinary skill in the art) to identify third party products and services available to a given user based on the user's geographic location, and enable a user to select and order such products and services directly (i.e., without having to contact the third party product and service providers individually). Further, the facilitation module 128 may aid users in managing the acquired services by providing expenditure analysis, generating alerts when new or less expensive product or service plans become available, introducing new money saver promotions related to products or services, etc.

In the embodiment shown in FIG. 1, the facilitation module 128 includes one or more sub-engine(s) or module(s) that facilitate its third party product and service recommendation and order functionality. As seen here, the facilitation engine 128 includes a consumer engine 130, a serviceability engine 132, and an advisor engine 134. Operation of the engines is briefly described below, and in more detail in the following sections.

According to one aspect, the consumer engine 130 recommends the most suitable products and services and/or service providers 104 to the users 106 based on user preferences, profitability goals, popularity of products or services, etc. Specifically, the consumer engine 130 generates an ordered list of products or services based on user preferences, user location, user information, product and service information, etc., by performing extensive analysis and calculations on this and other information from the customer information database 116, the capabilities database 118, the products and services database 120, the address database 122, or the order history database 124. The ordered or ranked list is intended to represent products or services that a given user is most inclined to purchase or most fits the user's needs. This ranked list of services can be displayed to a user for selection, viewing, and ordering, or similarly displayed to a customer service representative that relays the information to a consumer. Alternatively, the most optimal or most highly-recommended services can be extracted and displayed to a user, or automatically ordered via the order facilitation system 100.

In one aspect, the serviceability engine 132 determines the availability of products and services at a particular address/locality utilizing stored data from the products and services database 120 or utilizes real time data provided directly from the service providers 104. To this end, one embodiment of the serviceability engine 132 utilizes information from the user 106, such as an acceptable service address, dwelling type, and user identification. Further, the serviceability engine 132 generally uses data from the capabilities database 118 and address database 122 to determine the peripheral or additional requirements for a given service and to ascertain whether those capabilities are present and/or available at the user's address. Further details and functionality associated with embodiments of the serviceability engine 132 are described in greater detail below.

According to one aspect, the advisor engine 134 provides users with up-to-date and personalized information and/or advice on their home services such as electricity, gas, satellite television, cable television, phone, Internet, home security, insurance, home warranty, and other similar products and services. The advisor engine 134 provides recommendations to users regarding new or different product or service options based on a variety of factors such as personalized service usage trends, current product or service costs, available product or service options, competitive landscape, user experience based on customer reviews, and other similar factors. Users 106 can order or purchase new or different product or service plans based on the provided recommendations. In addition, the advisor engine 134 allows users to manage their home services, view their usage trends compared to other users or their own previous usage, plan budgets for future usage, and track expenditure versus budget for all of their home services. The advisor engine 134 also provides capabilities of setting up alerts for specific events such as when new deals are offered by product and service providers, when pay-per-view or movie-ordering thresholds are reached within a user's home, when mobile phone minutes usage reaches or exceeds a given threshold, etc. As will be understood and appreciated, these alerts can be provided via varying delivery mechanisms such as text (SMS) message, email, phone, and so on. To provide these functionalities, the advisor engine 134 utilizes information from information sources 104, 108, 110, and the databases 114, and it conducts extensive analysis and calculations on this data. The information may be provided to the users 106 in the form of usage reports, graphs, charts, product comparisons, and other such report formats. According to various embodiments, the advisor engine 134 also enables product or service bill pay, provision of "green" tips for energy-efficient service usage, and a host of other functionalities.

Additionally, as will be understood, the facilitation module 128 includes other engines, modules, and functionalities not described herein as will occur to one of ordinary skill in the art. Further, the electronic system 100 is not intended to be limited by the specific information sources, databases, engines, and other components shown and described herein. As will be understood and appreciated, the architecture of the electronic system 100 may vary as needed and as will occur to one of ordinary skill in the art.

Figure 2:
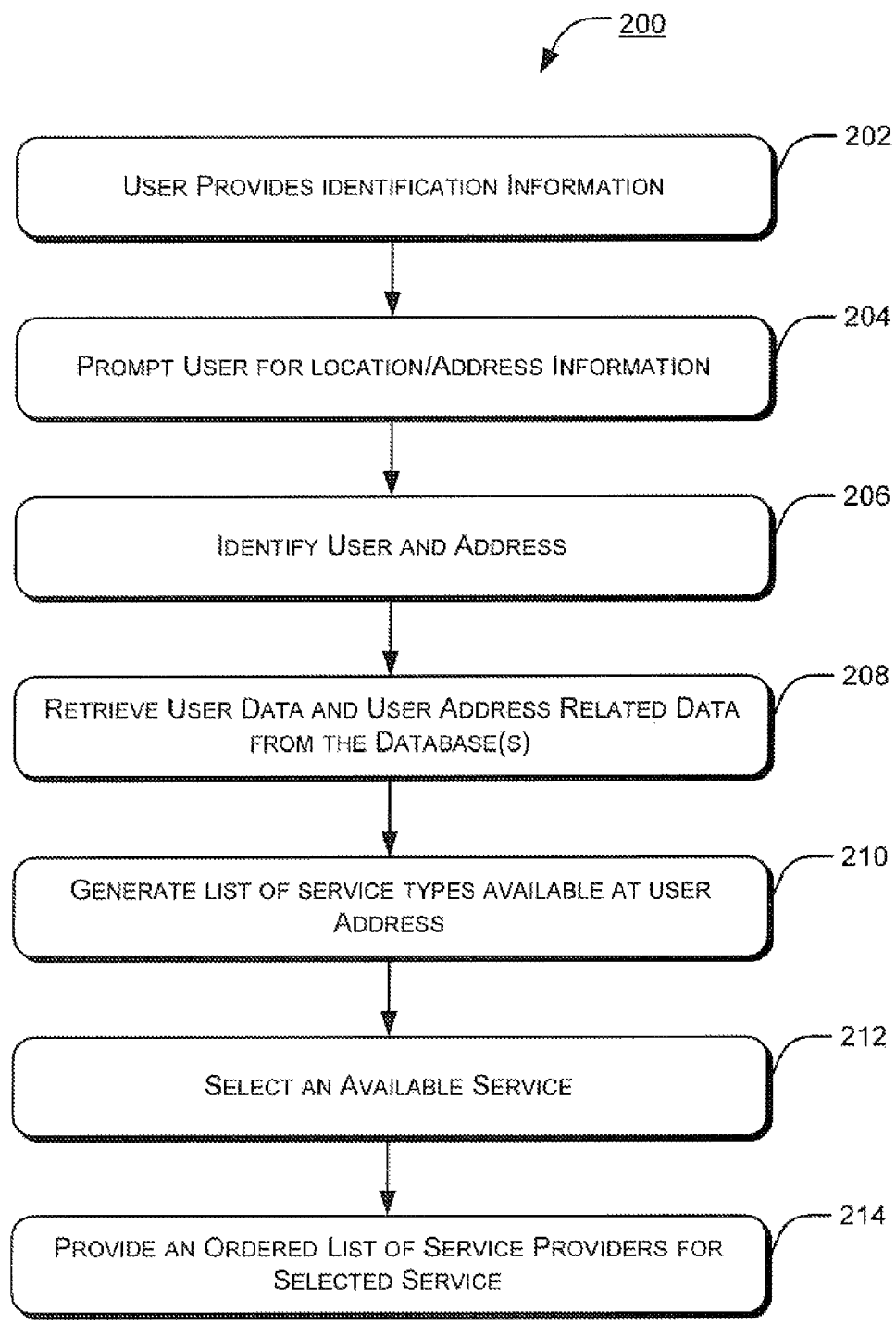
FIG. 2 is a flowchart illustrating an exemplary method for electronic acquisition of products and services provided by an order facilitation service according to an embodiment of the present system.

FIG. 2 illustrates an exemplary, high-level order facilitation and recommendation process 200 according to one embodiment of the order facilitation system 100. According to one embodiment, the process 200 is carried out by the computing system 102, and specifically the facilitation engine 128. For the exemplary process, it is assumed that a user, such as user 106 associated with address-A 136 (see FIG. 1), relocates from address-A to address-B 138. Although, as will be understood and appreciated, no relocation is required in order to utilize aspects of the facilitation system or computing system 102. At address-A 136, the user 106 has a satellite television connection 140, and a telephone connection 142, which the user wishes to disconnect or transfer to his or her new address. As shown at the new address (address-B 138), the user wishes to transfer the satellite 150 and telephone 144 services (potentially to new service providers with new service plans), and install new services such as an Internet connection 146 and electricity 148. As described previously, a user may or may not know which products or services he or she wishes to install at his or her new residence, and thus the order facilitation and recommendation process 200 carried out by the facilitation module 128 assists the user in selecting and ordering such products and services.

To this end, and referring to FIG. 2, at step 202, the user 106 accesses the computing system 102 via the network 112 and the user interface 126, and provides identification details to gain access the computing system 102. FIG. 3 illustrates an exemplary "log-in" or user identification screen 300, which requests user information. The user interface 126 (e.g., screen 300 in FIG. 3) may have drop down menus, service buttons, or may require the user 106 to type in a query or response. Upon authorization, the user 106 is prompted for location information for the address at which a product or service is requested (step 204) (see FIG. 4 for exemplary location identification screen 400). In some cases, if the user 106 is a regular customer of the facilitation system 100, the user's information may be up-to-date in the databases, and the user 106 may not be required to enter any information into the address screen (step 206). Alternatively, the user interface 126 may display the user's last saved address along with other details and prompt the user to verify these details.

After the computing system 102 has identified the particular user and user's address, at step 208, the facilitation module 128 retrieves data from one or more databases 114 to determine products and services available to the user. In some cases, the retrieved information may be filtered before any analysis. For example, if the user 106 requires information about Internet, phone service, electricity, and cable services, information pertaining to service providers 104 that do not provide these services may be discarded. The retrieved product and service information may be further filtered by the user's address. If any service is not available at the user's address (for example, based on serviceability information or product and service requirements), information pertaining to that service can also be discarded. Additional details relating to filtering products or services based on serviceability information are provided below. It will be understood that various other filters may be applied to the data based on user inputs, or preferences, without departing from the scope of the present disclosure.

To install new products or services, the user 106 may want to know all of the products and services available at the new address (e.g., address-B 138), and the most appropriate services from the available list. AT step 210, the facilitation engine 128 generates a list of available product and service types available at address-B 138 based on the information retrieved during step 208. As mentioned previously and as will be understood, according to one aspect, the list of service types or particular services may be presented based on previously-determined serviceability criteria. FIG. 5 illustrates an exemplary screen shot listing product and service types available at a given address. As shown, the user is able to select types of products or services in which the user is interested (step 212).

After a user selects one or more service types, the system 100 identifies and provides a list of the particular product and service plans associated with the selected service types. According to one embodiment, the facilitation module 128 provides specific recommendations of products or services to the user. To do so, the facilitation module 128 ten analyzes various retrieved information, along with the user's preferences to provide analyzed results to the user 106 via the user interface 126 (step 214). Specifically, based on the user's preferences and address-B 138 capabilities, the facilitation module 128 recommends products or services 158 to the user 106. These recommended products or services are intended to meet a desired objective (e.g., best suited for user's needs, most profitable services, etc.). The results may include a ranked list 160 of service providers, or a ranked list of product and service plans based on user preferences and ranking factors and/or serviceability information, a comparison report 164 of different providers or products and other similar results.

FIG. 6 illustrates an exemplary ranked list 158, 160 of products and services. Here, for each service type offered to a user, the facilitation module 128 provides an ordered list of the services. Based on these recommendations, the user 106 can make an educated decision regarding which service he or she wishes to purchase. Moreover, the user 106 does not have to visit multiple service providers 104, provide personal details to each vendor separately, or compare prices manually as the electronic system 100 aids the user 106 in all decisions pertaining to utility services or products.

According to an alternative embodiment, rather than providing a ranked list of suggested products or services, the facilitation module 128 simply presents all products or services (e.g., of a given type, or offered by a particular provider) to the user. For example, as shown in FIG. 7, all services potentially available at address-B 138 offered by Telco are shown. In this way, the user can select from all products or services offered at a given location, whether those services are ranked or not.

In one embodiment, if the user 106 selects any service or product from either the ranked list or unranked list, such as a telephone service, the computing system 102 may interact directly with the service provider 104 that offers that service, in real time, to complete an order for the selected product or service, or a transfer of the product or service. In so doing, the system accesses particular user information, plan information, or service information. FIG. 8 illustrates an exemplary user interface 800 pop-up screen requesting details from the user. Here, the user may be asked questions relating to current phone services used for purposes of cancellation or transfer. Further, the computing system 102 may request the user's permission to access his or her records from his or her current phone service provider 104.

Additionally, if the user 106 selects a particular product or service plan from the list of available plans (e.g., from the Telco plans shown in FIG. 7, or the ranked cable service plans shown in FIG. 6), then the computing system 102 may update user or service information via the service provider's web portal. For example, if the user 106 wishes to modify a local telephone plan with Telco, the computing system 102 may directly connect to the Telco website, login, change the user's service plan, make payments, and update the user's connection plan. Further, if the user requests an additional phone line, the system can request installation services with the Telco website. In this manner, the computing system is able to efficiently interact with all the service providers 104, request installations, disconnections, or upgrades, in real time, in effect reducing or eliminating user interaction with individual service providers 104.

Alternatively, upon ordering a given service, the computing system 102 may receive the user's selection of a plan and store this information. Later, the computing system 102 may retrieve this information and provide an update to the associated service provider 104 with the user's selection. This update may be carried out through the Internet, via a phone call to a representative of the service provider 104, via a third party agent, or through any other communication method. Once the user's order is confirmed, the user interface 126 may provide a summary of the products or services ordered. FIG. 9 illustrates an exemplary table 900 indicating the user's acquisition summary. This information is stored in the customer information database 116 and the order history database 124 for future recommendations to the same or other users.

Having described the general functionality of an embodiment of the computer system 102, facilitation engine 128, database(s) 114, and other related components, a detailed description of an embodiment of the serviceability engine 132 is described in detail below.

Exemplary Serviceability Engine

As described previously, the order facilitation system generally includes a serviceability engine 132 that determines particular product and service plans offered by particular product and service providers at a particular geographic location based on disparate sources of information. Specifically, the serviceability engine includes operative connections to service provider systems and other external data sources (e.g., tax records, U.S. Postal Service database, census data, user-entered data) that enables the serviceability engine to identify products and services available to a given geographic location based on specifics associated with the service providers (e.g., only provides service in Atlanta), capability requirements associated with the products and services (e.g., requires recycling pickup service), and capabilities available at the given geographic location (e.g., existing satellite connection). The serviceability engine also parses and normalizes disparate address information to enable efficient processing of that information and accurate retrieval of available products and services. As used herein, "serviceability" refers to determination of particular product and service providers that provide services to a given geographic location, the specific products and services offered to the location by those product and service providers, and capability of the given location to accept or utilize the specific products and services.

According to one embodiment, the serviceability engine 132 comprises a framework that provides serviceability information about third party service providers 104 to users of the order facilitation system 100, or to other components within the system for additional processing. As described in detail herein, serviceability information is determined based on a variety of factors related to user demographics, address or location characteristics, products/services available at a user's service address, product capabilities, address capabilities, and other similar parameters. Generally, products and services available to user locations include electricity, natural gas, satellite television, cable television, wireless telephone, landline telephone, Internet, home security, home insurance, home warranty, newspaper delivery, home cleaning service, moving service, dry-cleaning, trash pickup, pest control, and other similar products and services. As will be understood and appreciated by those of skill in the art, however, other products and services are contemplated within the scope of the present disclosure.

In a basic illustrative example, the serviceability engine 132 requests that the user 106 provide address or location information such as home address, dwelling type, etc. Based on the input address information (such as 123 Pleasant Dr, Atlanta, Ga. 30324, house), the serviceability engine 132 parses and normalizes the information to generate a standardized address to assist in further processing. The standardized address is then confirmed against known address information, such as that provided by the US Postal Service, or the US Census Bureau, etc. Using the verified, standardized address, the engine 132 retrieves one or more predefined markets associated with the address, and a corresponding list of service providers 104 that provide products and services within the identified market(s). Next, a list of products and services or plans offered by the service providers 104 in the identified market is retrieved. Further, the available capabilities of the given address, along with the capabilities required for each product and service offering, are identified and retrieved. Finally, the capabilities of the retrieved products/services are compared with the capabilities available at the service address to generate serviceability information 152 for the given address.

The serviceability information may be used in a variety of ways. In one way, the serviceability information is displayed to a system user in a list or other format such that the user is able to determine product and service offerings that are specifically offered to the user's residence. For example, if the user's property is already equipped with a telephone cable, but does not have broadband connectivity, the serviceability engine 132 may only list the Internet service providers that provide cable connections (or, at least may list them with greater priority or prominence in the list than those that require other types of connections). In another way, the serviceability engine 132 may provide the serviceability information to other components or modules within the computing system 102 (such as the advisor engine 134 or consumer engine 130) to be used as an initial input/filter such that those engines do not provide product or service offerings to a user that are not actually available at the user's address. As will be understood, the serviceability information can be used in numerous ways as will occur to one of ordinary skill in the art.

Figure 10:
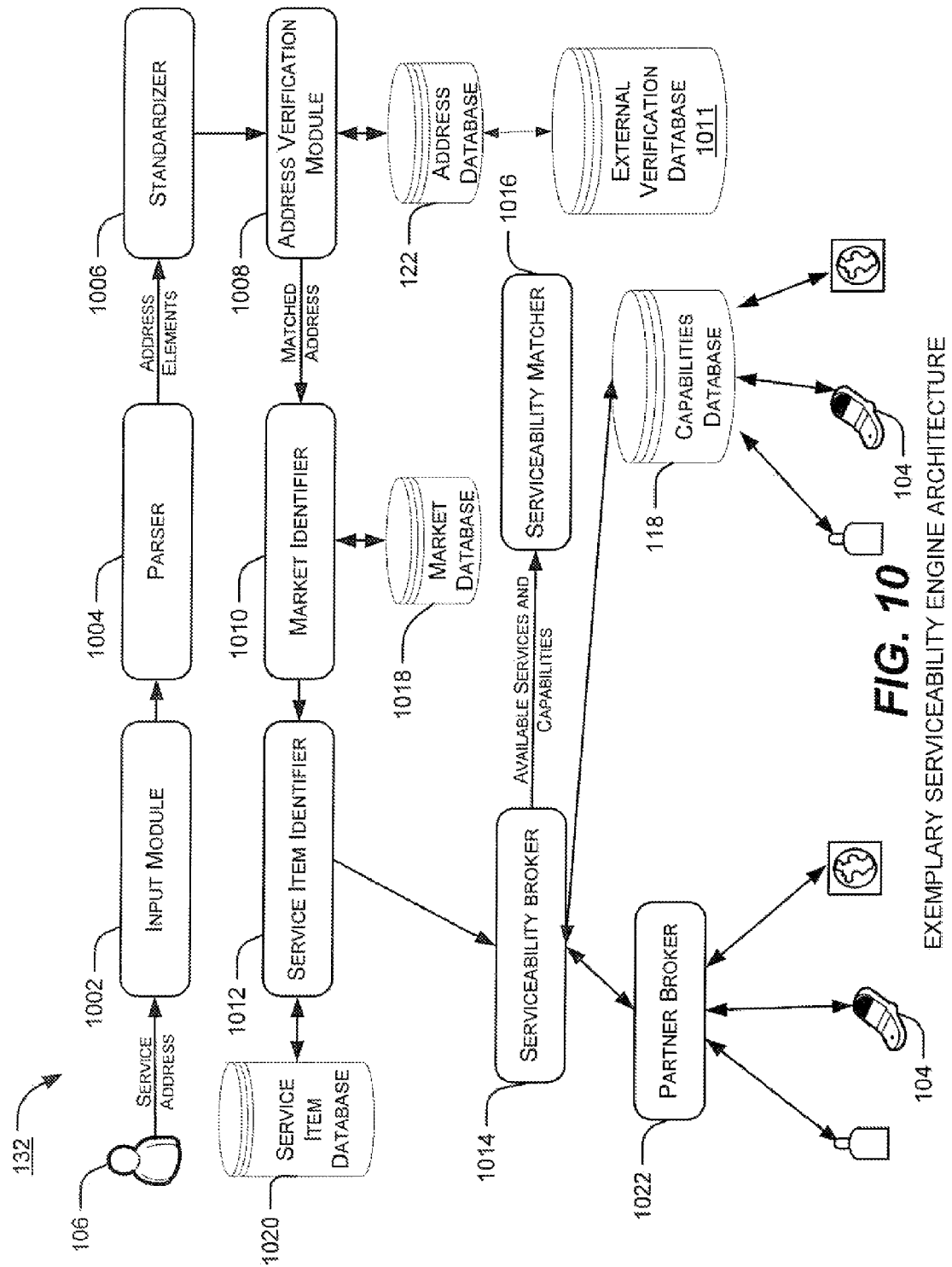
FIG. 10 illustrates exemplary serviceability engine architecture according to an embodiment of the present system.

FIG. 10 illustrates an exemplary serviceability engine architecture 132 according to one embodiment of the present system. As shown, the embodiment of the serviceability engine 132 includes several system sub-components, including an input module 1002, a parser 1004, a standardizer 1006, an address verification module 1008, a market identifier 1010, a service item identifier 1012, a serviceability broker 1014, and a serviceability matcher 1016. As will be understood, each of these modules/components may comprise software programs, algorithms, processors, or other system components depending on the particular embodiment. These modules/components generally include operative connections to one or more databases to facilitate information exchange, such as the address database 122, an external verification database 1011, a market database 1018, a product or service item database 1020, the capabilities database 118, and other similar databases. As will be understood, according to one embodiment, the modules, databases, and other serviceability engine components may be connected via network connections, the Internet, or other similar connections (not specifically shown). As will be further understood, the specific components and databases shown and described are intended to be illustrative only, and actual embodiments of the present system include various other architectures. The functionality of each of these modules and databases is described in detail in the following sections.

According to one aspect, the input module 1002 is configured to receive information from the user 106. The input module 1002, in one embodiment, is connected to the user interface 126 to provide a platform for users 106 to input data using various data entry techniques, such as text input, drop down menus, text selection, or any other techniques known in the art. Alternatively, in a call center environment, the input module 1002 interfaces with a customer service representative (CSR) who obtains necessary information from an end consumer. The user 106 may contact the call center, and the CSR may request the user 106 to provide address information or other pertinent information. In turn, the CSR may enter this information into the input module 1002 through another interface. As will be understood, other mechanisms for obtaining the necessary address information may be utilized by embodiments of the present system without departing from the scope of the present disclosure. For example, if the user 106 is a registered member or prior user of the facilitation system 100, the user's address information may be stored in the customer information database 116 or address database 122, and thus the input module 1002 may directly retrieve this information from those databases. Further, the input module 1002 may request that the user 106 confirm the stored information (in case the user has relocated).

As mentioned, the input module 1002 obtains basic information from a user (or CSR, etc.) regarding a user/consumer's address or residence. This information generally includes a house number (e.g., 123), a street name (e.g., Pleasant, Main, etc.), a street type (e.g. drive, lane, avenue, etc.), a cardinal direction (e.g., NE, SW, etc.), a city (e.g., Atlanta), a state (e.g., Georgia), and a zip code (e.g., 30324). In addition to this basic address information, the input module may also request further information so as to identify the most optimal services for a given user (e.g., via the consumer engine 130). For example, the input module 1002 may request the user 106 to input a dwelling type (e.g., residential, office, house, apartment, rented property, etc.), a user name, age, whether the user is relocating, a user password, email address, and so on.

It is often the case that address information provided via the input module 1002 is in a non-standardized format, is missing certain vital information, is misspelled, etc. For these reasons (and others), the input module 1002 provides the address information to the parser 1004, which performs analysis on the data (e.g., syntax analysis) to identify key components of the data. According to one embodiment, the parser 1004 analyzes individual address blocks or elements to determine its grammatical structure with respect to a predefined set of address elements. As mentioned, addresses generally include a house number, a street name, a street type, a cardinal direction, a city, a state, and a zip code. Thus, the serviceability engine 132 employs the parser 1004, which includes proprietary logic to determine which input address elements match a preconfigured set of address elements. To this end, the parser 1004 breaks down the input address information into individual address elements and attempts to match the individual address elements with the preconfigured set of address elements.

For example, if the user enters "314-A Atlanta St. George Street Georgia 32321-4378", the parser 1004 breaks the address down into individual elements such as "Atlanta", "Georgia", "St. George Street" "314-A", and so on. According to one embodiment, individual address elements are separated based on spaces, commas, or some other delimiters in the input address information. Once separated/extracted, each individual element is compared with a repository of address elements to determine which input address element corresponds to which predefined address element. For example, the "Atlanta" element may first be compared with a list of U.S. states. Upon determining that "Atlanta" does not match and pre-stored U.S. state, the parser 1004 may next compare the "Atlanta" element to cardinal directions, street types, and so forth. Upon identifying a match (e.g., Atlanta is compared to a list of cities in Georgia), an identifier is linked to the "Atlanta" element indicating the element as a "city". Once this is determined, the parser 1004 may analyze the other input address elements to determine if the user entered "Georgia." If yes, that element will be allocated the "state" element, and so on. In this manner, the parser 1004 classifies each input address element under one or more predefined address elements.

In some circumstances, a given input element may match several predefined elements (e.g., a street name of "Savannah Lane" may match both a street name and a city name). Or, certain elements may not be classified under any predefined address elements. Further, the parser 1004 may determine that the user 106 has not entered text against one or more predefined address elements. In these circumstances, the parser 1004 may present a confirmation screen to the user requesting confirmation of the address information, or requesting the user 106 to enter the complete address again, or verifying from amongst several address elements which ones are correct. In another embodiment, the parser 1004 may assign a confidence score to the identified elements (e.g., based on past usage, the system determines that "Savannah" typically refers to a city, not a street), and associates the extracted input address element with the predefined element corresponding to the highest confidence value. As will be understood, various techniques may be used to parse the address information and sort it according to predefined address elements.

Still referring to FIG. 10, the parsed address elements are provided to the standardizer 1006, which reassembles the address elements into a normalized and standard address format. A standardized format is beneficial for system processing, as it enables the computer systems to treat all address data as of the same type, and enables more efficient data storage, comparison, etc. As will be understood, the standardizer 1006 may be configured to assemble the address elements according to any predefined address format. For example, one address format may require the address elements to be ordered in the following fashion—house number, street name, city, state, zip code. Alternatively, according to another format the address elements can be formatted in reverse order. It will be understood that the address format may vary without departing from the scope of the present disclosure. Typically, the address is formatted such that it may be easily compared with pre-stored addresses for verification purposes (such as the US Postal Service database, Yellow Pages™ database, etc.).

Once the address information has been standardized by the standardizer 1006, the address verification module 1008 receives the standardized address, which it then compares with pre-stored formatted addresses. The purpose of the verification module 1008 is to confirm that the standardized address information matches a real or known address location that may be used by other system modules to perform the serviceability analysis. The address verification module 1008 may use a variety of methods to retrieve pre-stored addresses for comparison purposes. According to a first method, the module compares the standardized user address in real-time with addresses in an external database (e.g., the US Postal Service database 1011). According to a second method, the serviceability engine 132, at regular intervals, retrieves address information from external sources 110 (e.g., USPS database 1011, tax records, U.S. Census Bureau databases, etc.) and stores this information in the internal address database 122. Thus, the user address may be compared against stored addresses in the internal address database 122. As will be understood, other methods for comparing standardized address to known addresses may be employed within embodiments of the present system as will occur to one of ordinary skill in the art.

In some circumstances, a standardized address may not exactly match a known address. Accordingly, some embodiments of the present disclosure include a "degree of match" feature within the address verification module 1008. For example, a closest match may be identified for a given address, but the input address may have a transposed house number, or slightly misspelled street name. According to one embodiment, the serviceability engine 132 uses proprietary logic to make a "best guess" as to which known address applies to the standardized user address. Alternatively, a user may be prompted to confirm that an identified address is the correct one, or may be asked to select from a number of identified addresses, or may be asked to enter in additional information, etc. Further, some embodiments of the present system include aliases or links between given address elements.

For example, the city of Atlanta may overlap with the city of DeKalb, and thus the serviceability engine 132 treats these inputs as being one in the same for matching purposes.

It will be understood that, according to some embodiments, the user 106 may be prompted to input address information in a standard format using address element pointers, maps, and the like (e.g., click boxes with pre-populated data). In these situations, the parser 1004 and the standardizer 1006 modules may be unnecessary and the serviceability engine 132 can function efficiently without these modules.

Still referring to FIG. 10, once the user's address has been verified against a known address, the address information is provided to the market identifier 1010 to identify the relevant, predefined market for the address, and subsequently the products and services available in that market. Often, product and service providers provide serviceability data and product and service information to the serviceability engine 132 that indicate availability of services according to specific addresses. During high call volumes or user activity with the facilitation system 100, it can be cumbersome and inefficient to process each individual address for each product or service offered from each provider during each customer order session. Thus, one embodiment of the serviceability engine collects, sorts, and stores product and service information according to "markets" in the market database 1018 (described in greater detail below in conjunction with FIG. 12) and/or the service item database 1020 (described in greater detail below in conjunction with FIG. 13).

Generally, a "market" or "market segment" is a grouping or designation that corresponds to particular products or services available in that market. For example, according to one aspect, markets are directly tied to serviceability of products or services. For example, all television providers that provide satellite television service to the Southeastern U.S. may comprise a market. Alternatively, markets may be geographically-based. For example, the U.S. may be divided into 70 market segments, such as 50 state markets, 19 metropolitan markets, and 1 market for the entire US. Or markets, may be defined according to zip codes, subdivisions within zip codes, etc. As will be understood, markets may overlap with each other. As will be understood and appreciated, a market may be defined according to virtually any reasonable designation as will occur to one of ordinary skill in the art. Generally, the market database 1018 includes information about each market segment along with market zip code ranges, cities or states covered, service providers available in each market, and so on.

As mentioned, service providers 104 often provide product or service information according to individual addresses serviced. Thus, according to one exemplary market structure, the serviceability engine 132 stores the product and service serviceability information against zip+4 codes (i.e., 9-digit zip codes) instead of against each address separately. For example, if Telco provides services in Columbus, Ohio, the serviceability engine 132 may simply store the zip+4 codes for Columbus city (43267-7676) against Telco. To this end, according to one embodiment, the serviceability engine 132 utilizes a crunching module that retrieves the 'addresses serviced' data provided by service providers and converts it into zip+4 ranges. This data conversion allows addresses to be stored in a more compressed and efficient manner.

Another challenge with serviceability is the management of differences between services in one market and the same services in a different market. For example, the same service offered by Telco in Ohio may cost $50, while in Georgia may cost a user only $45. Accordingly, one embodiment of the serviceability engine 132 defines unique attributes of a particular service within a particular market. For example, in Wisconsin, a broadband service for $45, offered by NetPro, might be called "BlazeNet"; while in Washington, the same service by NetPro may be available for $40 under the name "FastNet." Unique service attributes, such as these, are stored for each market in the service item database 1020.

According to an alternate embodiment, rather than defining markets for products and services offered by third party service providers, the serviceability engine 132 simply stores each individual address serviced by the service provider 104. In this embodiment, the market identifier 1010 and service item identifier 1012 modules may be unnecessary, as the serviceability engine merely compares and matches the standardized user address with the addresses stored against service providers to retrieve a list of service providers 104 and services that are provided to the address.

Still referring to FIG. 10, if markets are utilized within the serviceability engine 132, when the address verification module 1008 provides a standardized user address to the market identifier 1010, the market identifier then determines the relevant market segments associated with that address. For example, the market identifier may compare individual address elements from the standardized user address to market designations stored in the market database 1018. Next, after the market(s) are identifier, the service item identifier 1012 retrieves the relevant service items available in the user's market. For example, the user's zip code may be compared with the zip+4 code ranges stored in the market database to identify a particular zip+4 market, and then the service item identifier 1012 extracts service providers and services corresponding to matched zip code market from the service item database 1020. According to one embodiment, the service item database 1020 is a part of or related to the product and service database 120, and market items correspond directly to products and services or groups of products and services maintained in the product and service database.

After determining the relevant product and service offerings available in the user's market based on the user's standardized address, the serviceability broker identifies the capabilities of the user's address. These capabilities may be identified from the address database 122 (described above and in conjunction with FIG. 11 below), or from the capabilities database 118 (described above and in conjunction with FIG. 14 below), or from some other data location. For example, a given service provider that provides high-speed internet in a user's market requires a few capabilities at the user location in order to provide the service, such as fiber-optic cables running to the residence, fast switches, a LAN cable connection, and so on. Thus, the serviceability broker obtains this address capabilities information, and subsequently passes it to the serviceability matcher 1016 that performs a comparison and matching function of the capabilities required for services in the user's market against the capabilities of the user's address. Once the capabilities of the user's address are compared to the products and services available in the user's market (and the corresponding capability requirements of those products and services), a comprehensive list of all matched services available at a particular user address is provided to the user. Alternatively, the available services information is provided to other facilitation module 128 components for further processing.

Along with stored product and service serviceability information, according to one embodiment, the serviceability broker 1014 also retrieves this information in real time from the service provider databases directly. For example, in order to speed up processing times, the serviceability broker 1014 may identify product and service capabilities from a capabilities database 118, but simultaneously confirm the most up-to-date services available and corresponding serviceability information from the service providers directly. According to one embodiment, the serviceability broker 1014 utilizes a separate module, a partner broker 1022, to perform this functionality. Thus, the partner broker 1022 queries each service provider system during serviceability processing to obtain the available capabilities information in real time. In this manner, a rough serviceability estimate may be retrieved from the capabilities database 118 to save time and provide immediate information to a user, while exact capabilities information may be retrieved in real time from the service providers 104 to confirm the information retrieved from the database 118. This double retrieval of capabilities information (i.e., statically, and in virtually real time) helps augment and improve the quality and accuracy of the serviceability information 152.

Exemplary Database(s)

The following sections describe exemplary databases utilized for efficient functioning of the serviceability engine 132. It will be understood, however, that the specific databases, database schemas, tables, and specific information shown are provided for illustrative purposes only, and are not intended to limit the scope of the present disclosure. Other information items, formats, databases, etc. are contemplated within embodiments of the present system as will occur to one of ordinary skill in the art.

Figure 11:
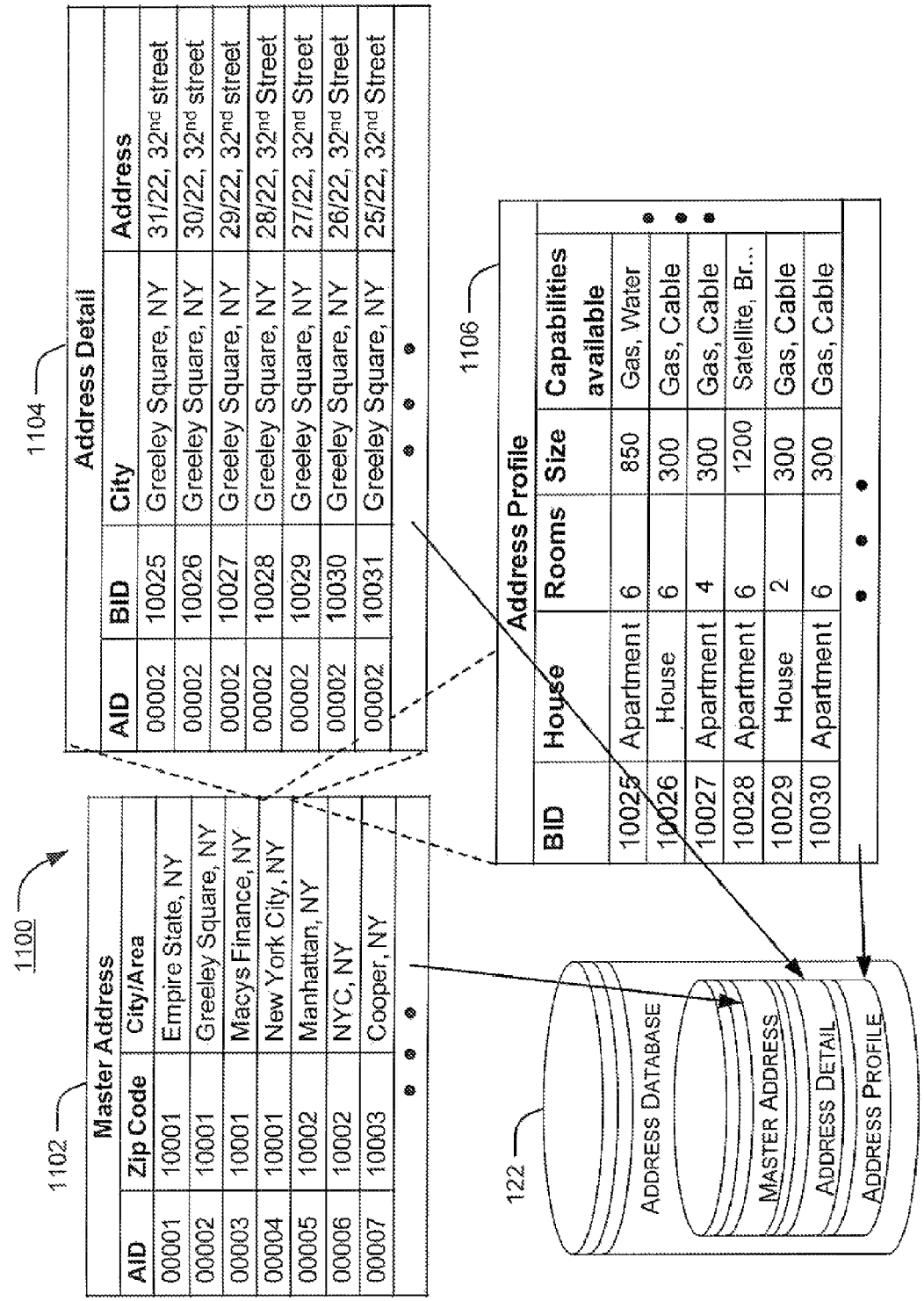
FIG. 11 illustrates an exemplary address database schema according to an embodiment of the present system.

FIG. 11 illustrates a database schema 1100 including exemplary data tables according to one embodiment of the address database 122. As described previously, the address database 122 may be used to store standardized addresses verified via the address verification module 1008. Or, the address verification module 1008 may confirm or verify standardized user input address information against pre-stored addresses in the address database, etc. Further, the address database may include capabilities information associated with each stored address. As will be understood, the address database may be used to store a variety of address-related information and be used for a variety of purposes according to embodiments of the present system described herein.

According to one embodiment, the address database 122 (as well as other databases described in the present document) stores data in a relational fashion. A typical relational database includes multiple tables, each table containing a column or columns that other tables can link to in order to gather information from that table. By storing this information in another table, the address database 122 can create more precise tables for more efficient processing of information that can then be used for a variety of purposes by other tables in the database and other databases. FIG. 11 illustrates some exemplary tables that are included in the shown embodiment of the address database 122. It will be understood, however, that the number of tables, specific tables shown, data in the tables, and the relation between the tables may vary depending on the particular embodiment, without departing from the scope of the present disclosure.

According to the embodiment shown in FIG. 11, the schema 1100 includes a master address table 1102 including address information for particular geographic regions or areas. For example, the master address table 1102 may store city, state, county, etc., data for every zip code in the U.S. (or zip codes in a certain region, etc.). Each address or entry in the master table 1102 is associated with a unique address identifier (AID). The database may include separate tables for each AID, with actual residence or location addresses within each particular AID. For example, within AID 00002, there may be sub-identifiers for each apartment number, or specific address, or building, etc. This information is depicted in exemplary address detail table 1104.

Further, each entry in the address detail table 1104 may be linked to an address profile table, such as the address profile table 1106. This table 1106 may include specific details about each residence, such as residence type, number of rooms, plot size, capabilities available at the residence, and other similar details. It will be understood that various other parameters may be included in the address profile table 1106, describing various other property details, such as previous services installed or provided at the address, service providers used previously or currently, and so on. Again, it should be understood that that the specific databases tables and specific information shown therein are provided for illustrative purposes only, and are not intended to limit the scope of the present disclosure.

Generally, the address data in the address database 122 may be provided from a variety of sources. For example, as described above in conjunction with FIG. 10, a user may input user address information into the present system, which then parses, standardizes, and verifies the information, and finally stores the information in the address database. Alternatively, information in the address database may be pre-populated from one or more external information sources 110 or external databases 1011, such as the U.S. Postal Service database, real estate databases, census information, third party providers, and so on. The address detail information and the profile information are typically standardized and stored in a predefined and configurable format for purposes of comparison with product and service capabilities and other processing. Moreover, the address information may be refreshed regularly. For example, the capabilities available at the address may vary over time, with new service connections, hardware, or services being available at an address or certain other services discontinued at the address. The address database 122 should be regularly updated for efficient functioning of the serviceability engine 132.

Figure 12:
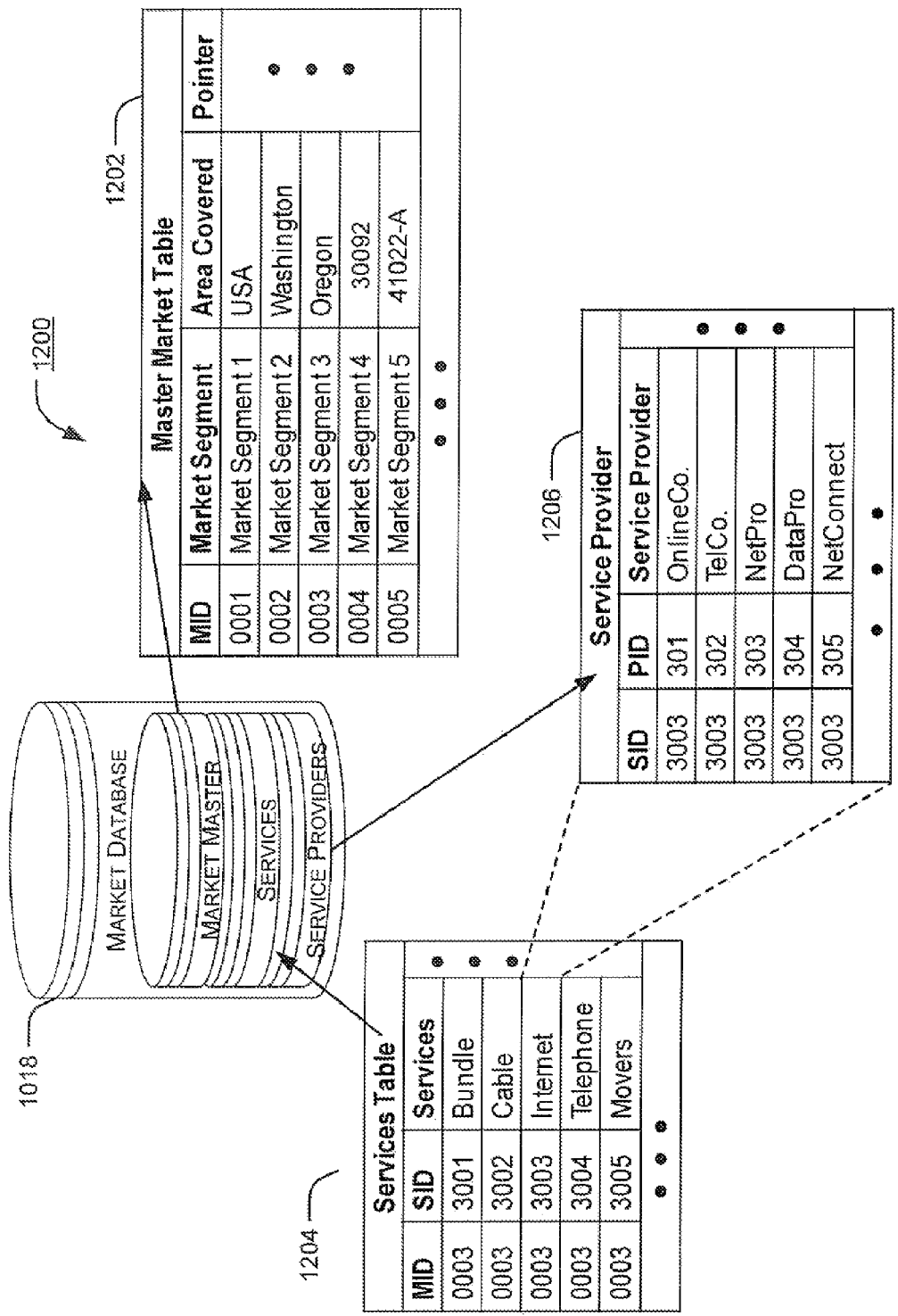
FIG. 12 illustrates an exemplary market database schema according to an embodiment of the present system.

FIG. 12 illustrates an exemplary market database schema 1200 that is operatively connected to the market identifier 1010 for exchanging information and identifying market segments associated with a particular user address according to one embodiment of the present system. Similarly to the address database 122, the market database 1018 may also comprise a relational database structure including several inter-related tables. FIG. 12 illustrates some exemplary tables that may be present in the market database 1018. It will be understood, however, that the number of tables, specific tables shown, data in the tables, and the relation between the tables may vary depending on the particular embodiment, without departing from the scope of the present disclosure.

Generally, the market database 1018 includes information pertaining to predefined market segments in various geographical areas and the service providers that provide products or services in those markets. The information in the market database 1018 relating to market segments may be updated at regular intervals or retrieved in real time from various third party service providers 104 or other external sources 110. As service providers introduce new services or products in different markets, or as new service provider enter a particular market, the information in the market database should be updated to remain current. To track this information, the market database 1018 queries service provider databases (through the serviceability broker 1014 or other information retrieval mechanism), or other external sources to refresh the list of service providers 104 and their offered products and services. To this end, the market database 1018 queries third party service providers 104 either electronically via communication links and/or interfaces between the facilitation system 100 and the third party provider systems, or through a manual call center, and obtains information relating to specific parameters, such as service provider name, product or service name, markets serviced, etc. This information is stored systematically under each parameter in the market database 1018. It will be understood that the parameters may have variable update requirements (for example, the "service provider name" and "markets served" parameters may vary more frequently than the "service name" parameter), and based on expiry of information pertinent to a parameter, the database may retrieve information corresponding to only that parameter. In another embodiment, the information corresponding to all the parameters may be refreshed regularly.

As shown in FIG. 12, the schema 1200 includes a master market table 1202, which includes a list of all the possible market segments in a particular geographical area, or associated with particular product and service capabilities, etc. For example, if the serviceability engine 132 is employed in the U.S., the table 1202 may include all or some of the predefined market segments in the U.S. Similarly, if the serviceability engine 132 is utilized in another jurisdiction, such as Europe, the table 1202 may include all the market segments of Europe. Here, the master table includes U.S. market segments along with area details and Market Identifiers (MID).

According to one embodiment, the master table 1202 is related to one or more other tables through the unique MID. For example, the master table 1202 may be related to a services table 1204 that illustrates all the services available in the market segments. Here, table 1204 depicts all the services available in market segment 3. This table in turn may be related to other tables through the unique SID, such as the service provider table 1206, which depicts all the active service providers in a particular market segment. Here, table 1206 depicts all the active internet service providers in market segment 3. It will be understood that the list of service providers may vary over time, and therefore, this information is updated at regular intervals of time. As described previously, according to one exemplary embodiment, the market identifier 1010 retrieves the zip code or other address element of the verified service address, and compares the service address zip code with the zip code range in the master table 1202. A match determines the market segment in which the service address falls. Using this market segment, the market identifier 1010 can retrieve all the services and service providers active in that market.

Figure 13:
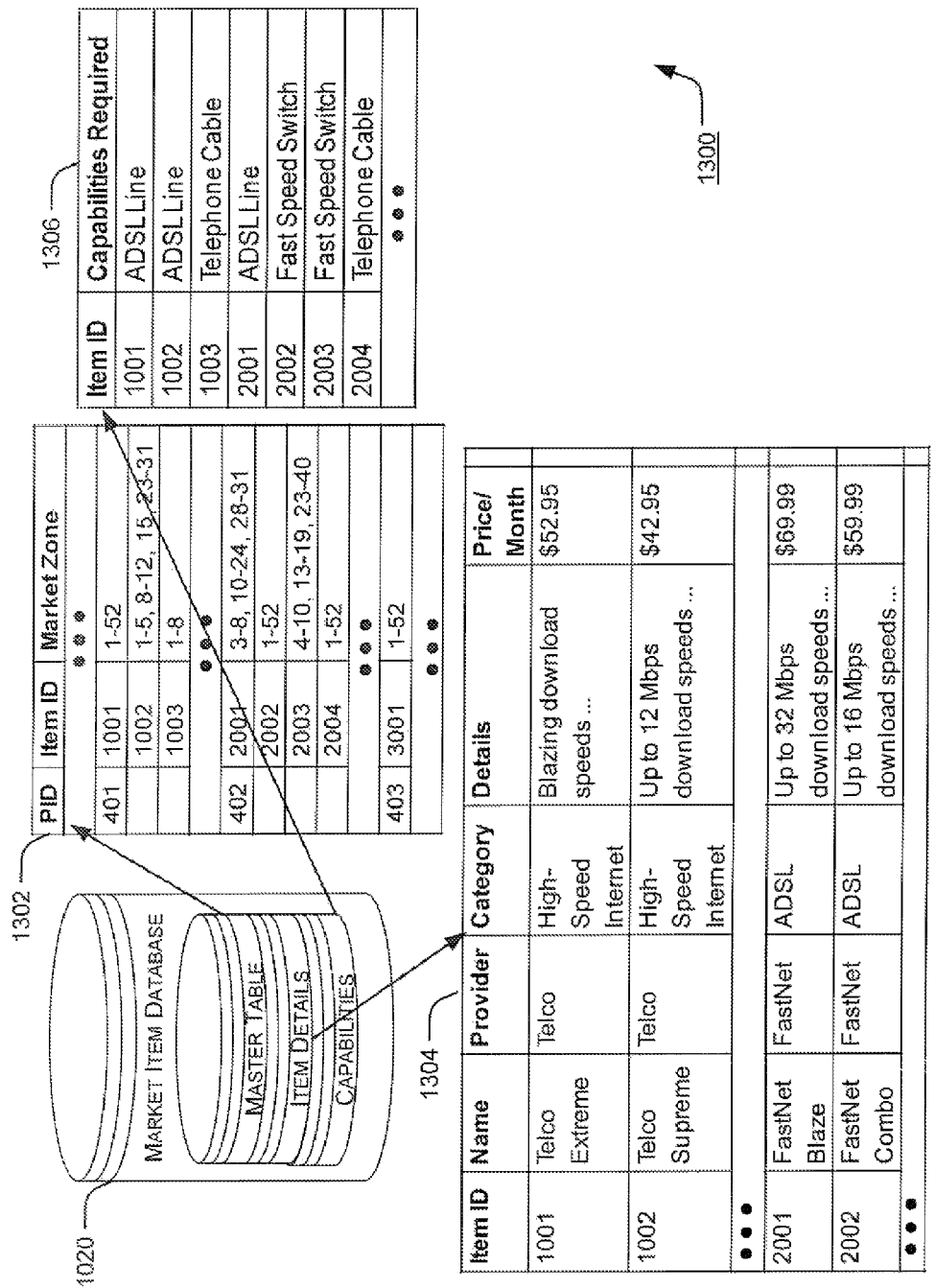
FIG. 13 illustrates an exemplary service/market item database schema according to an embodiment of the present system.

FIG. 13 illustrates an exemplary market item or service item database schema 1300 illustrating information in the market item database 1020 according to one embodiment of the present system. This database is generally an extension of the market database 1018, including services/products offered by different service providers in different market segments. Additionally, in some embodiments, the service item database 1020 correlates to, is a part of, or includes identical information to the product and service database 120. Further, the database 1020 includes unique service attributes and capabilities required for individual services. As described previously, the information in the item database 1020 is generally utilized by the item identifier 1012 to retrieve a list of services, their attributes, and capabilities based on the user address or market segment.

Similar to previously-described databases, the tables in this exemplary database 1020 have pointers and relations, cross-referencing data from one table to another. In the embodiment shown, the schema 1300 includes a master table 1302, which may be cross-linked with the service provider table in the market database 1018. Alternatively, this table may function independently of the market database 1018 and include a list of services offered by service providers according to each market segment. In on embodiment, each service in a market segment has unique product identification (PID). This master able may be interconnected to one or more other tables. For example, the master table 1302 may be related to the item details table 1304, which includes specific product or service details. Here, table 1304 depicts details of the services offered by Telco and FastNet in market segment 5.

Further, each service in table 1304 may have a pointer pointing to other tables, such as the "capabilities required" table 1306. This table includes a list of all the capabilities required for each service to operate efficiently. This information may be stored in any format, for example, the table may store capabilities required as one field in the table, and the capabilities required may be entered corresponding to that field. Alternatively, each capability may be represented as a separate field, and for each service, the required capabilities are merely checked or unchecked. Here, the table 1306 depicts capabilities required for the items depicted in table 1304. It will be understood that the tables in the item database 1020 may have more or fewer data fields, or completely different data fields, as compared to the exemplary tables depicted in FIG. 13. Further, the type, number, and size of the tables may also vary without departing from the scope of the present disclosure. For example, the master table 1302 may include services provided by service providers ordered according to the provider identification (PID). The table may also include market segments serviced by each service provider, and other similar information.

Figure 14:
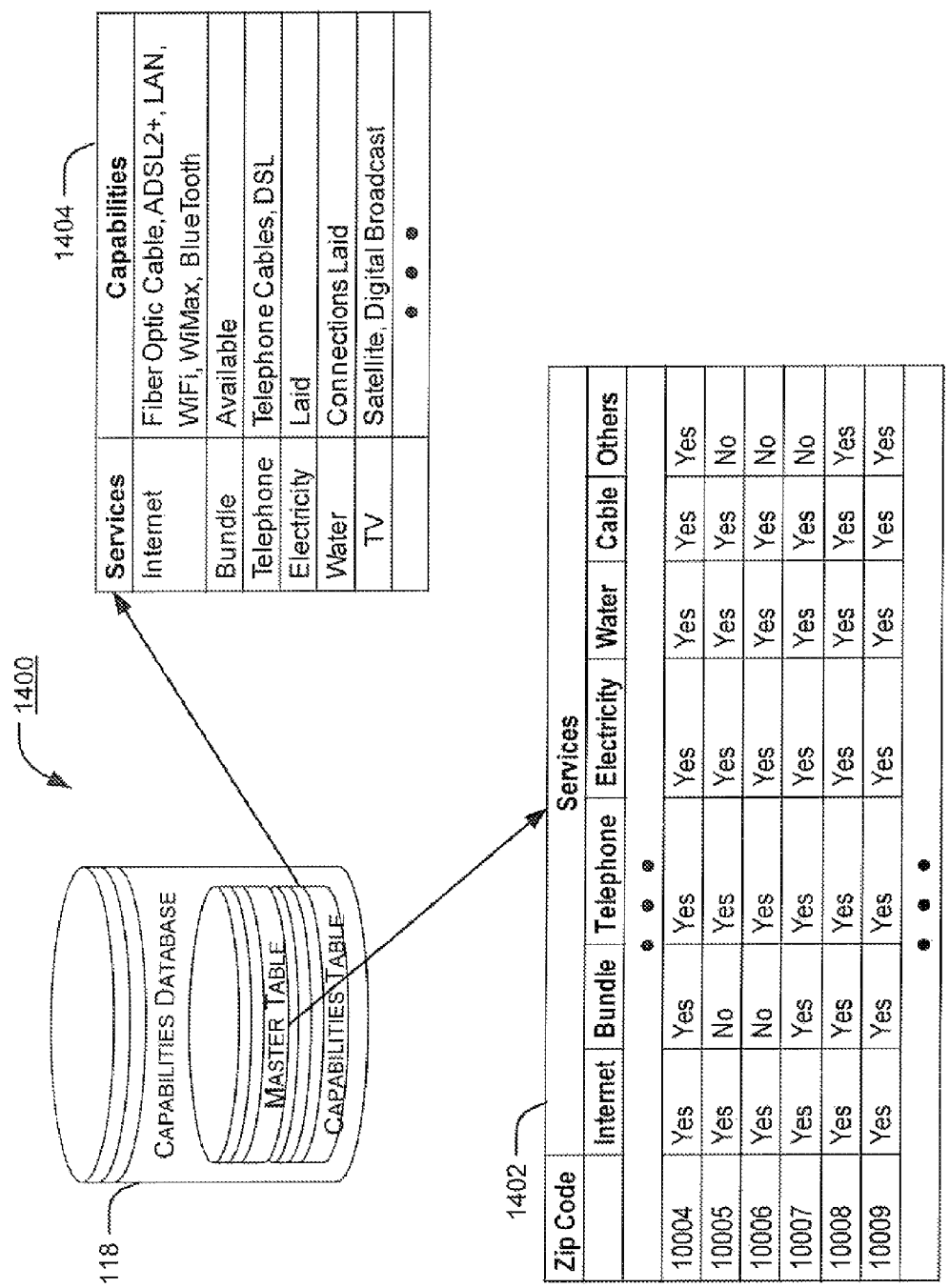
FIG. 14 illustrates an exemplary capabilities database schema according to an embodiment of the present system.

FIG. 14 illustrates an exemplary capabilities database schema 1400 according to an embodiment of the capabilities database 118. According to one embodiment, the capabilities database 118 stores information pertinent to capabilities available at user addresses. As will be understood, this information may be updated at regular intervals or in virtually real-time. In one embodiment, the database 118 includes a list of user addressees that includes information relating to the capabilities associated with each user address, and further the capabilities associated with each potential service offering provided to the address. For example, a given address may indicate that it is pre-wired for a security system, or that it has a septic system. Exemplary table 1404 illustrates a table indicating capabilities of a given address. As shown, the table includes the service types that could be utilized at the address, and the corresponding capabilities at the address associated with each service type. For example, the "television" service indicates that the address is equipped with satellite, and can receive a digital broadcast. As will be understood and appreciated, virtually any capabilities associated with a particular address and/or particular products and services offered to that address may be stored in the capabilities database 118.

According to an alternate embodiment, in addition to or in place of the address capabilities information, the capabilities database 118 may store capabilities associated with particular products and services offered by providers. For example, all of the services offered to a particular zip code may be stored in the database (such as that shown in table 1402). As mentioned previously, this information also may be stored in the service item database 1020 or market database 1018. In some situations, some addresses in a zip code may have certain capabilities, which other addresses in the zip code do not have. In these circumstances, the zip codes may be divided into smaller ranges, each with common capabilities. For example, the zip code 19103 may represent the complete city of Philadelphia. However, fiber-optic cables may be laid only in Philadelphia's city center, while the outer city suburbs may not have any fiber-optic connections. In this case, the serviceability engine 132 may divide the zip code into two separate segments such as 19103-A and 19103-B. Then, all city center addresses are classified under 19103-A, while the remaining addresses are classified under 19103-B. It will be understood that, in this manner, the capabilities database 118 may subdivide zip code ranges so that addresses in a particular zip code range have identical or similar capabilities. It will be understood that various other tables or data fields may exist in the capabilities database 118 without departing from the scope of the present disclosure.

Exemplary Process(es)

Figure 15:
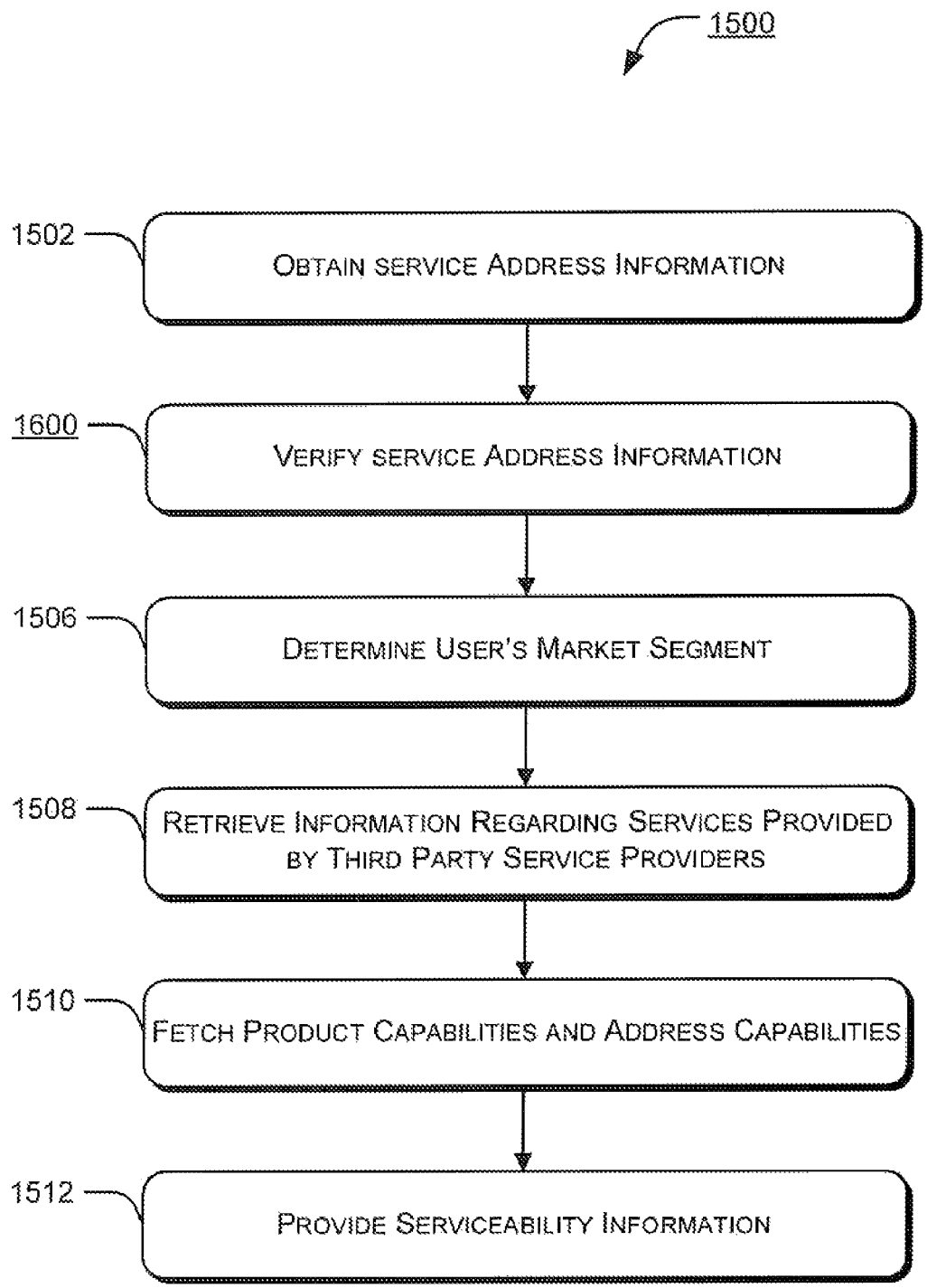
FIG. 15 is a flowchart illustrating an exemplary method for generating serviceability information according to an embodiment of the present system.

FIG. 15 is a flowchart illustrating an exemplary serviceability process 1500 for providing serviceability information 152 to a user. This process has been generally described elsewhere herein, but further details and aspects are described below in conjunction with FIG. 15. As described previously, form a high level, the method 1500 includes obtaining and verifying service address information, determining product and address capabilities, and comparing the required capabilities with the capabilities available at the service address to generate information relating to third party products and services available at a service address. As also described previously, the serviceability information may be displayed to a system user, or provided to other system components for further product and service ordering, other otherwise processed.

Starting at step 1502, service address information is obtained from a user (or CSR interacting with a user). In one embodiment, the user 106 accesses the serviceability engine 132 through the facilitation module 128. Here, the user is requested to enter service address information through the user interface 126. The service address information may include user's address details, residence type, whether the user is relocating, or other such address related details. In addition, an input module 1002 may request the user 106 to enter user details such as name, age, username and password, email address, and so on for registration or user recognition purposes. It will be understood that other related information may also be requested at this step.

As mentioned, in an alternative embodiment, the user may contact a customer support center, where a customer service representative (CSR) may request the user to provide address details. Other forms of address information retrieval are also possible such as interactive voice response systems (IVRS), drill-down address selection methods, and so on.

In other embodiments, if a user is already registered with the facilitation system 100, the customer information database 116 may include previously provided address details, which may be presented to the user for confirmation, instead of requesting address details. If the user has relocated, the user can update the address details as appropriate.

Next, the order facilitation system 100 verifies the service address by comparing the user provided address with a repository of standardized addresses (verification process 1600). Specific, further details associated with one embodiment of the address determination and verification process are described below in conjunction with FIG. 16. As mentioned previously, the repository or standardized or known addresses can be the USPS database, an internal database, a real estate database, or any other similar address sources that may contain current, standardized, known address information. The verification process can yield multiple results, such as exact match, near match, or no match with a known address. In an exact match situation, the matched address may be confirmed with the user and the serviceability process can be performed on this address. Alternatively, when an exact match occurs, no user verification may be necessary, and the serviceability process may continue without user confirmation. In case of a near match, the verification module may present a list of candidate addresses to the user, requesting the user to select the right address, or the verification module may request the user to provide partial or complete address details to supplement or replace the previously-provided information. If no matches are found, according to one embodiment, the address verification module 1008 informs the user 106 that the address could not be verified and requests the user 106 to enter the complete address again. Alternatively, the system may provide the user with a "best guess" of found addresses (i.e., addresses that may have some address elements in common with the user-supplied address). Here, the verification module may provide some guidance to the user informing the user of acceptable address formats.

Once the service address is verified, the serviceability engine 132 determines the user's market segment (step 1506). To this end, according to one embodiment, the market identifier 1010 compares the user's address, zip code, or other address-related information with a repository of market segments (e.g., the market database 1018) to determine the market segment(s) that correspond to the user's address and/or address capabilities.

Next, at step 1508, the serviceability engine 132 retrieves information relating to service providers and the particular products and services provided in the user's market segment based on the user's address or location. This information may be retrieved by performing a look-up in the item database 1020. Further, the item identifier 1012 may also retrieve the capabilities required by the services (step 1510). According to one embodiment, this information is present in the item database 1020 associated with particular products and services and other service details.

Also at step 1510, the system proceeds to retrieve capabilities available at the service address. Generally, a serviceability broker 1014 module queries the capabilities database 118 to identify pre-stored capabilities information. This technique exhibits quick processing times as the data is readily available in an internal database, which is regularly updated.

According to one embodiment, service provider capability information may be retrieved not only from the item database 1020, but also from the service providers 104 in virtually real-time. In the described embodiment, both methods are used to improve the accuracy and quality of the serviceability response. Based on the estimated response from the item database 1020, the serviceability broker 1014 queries relevant service providers 104. For example, if the item database 1020 displays that TVPro does not have any serviceability at the service address's zip code, the broker will not spend time querying the TVPro database in real time. Instead, the real time interface will only query the service providers 104 that do provide certain capabilities in the service address's zip code range. In this manner, the serviceability broker 1014 can narrow down the service providers using the item database 1020 or capabilities database 118, thereby reducing processing time considerably.

The serviceability information relating to service providers that provide products or services in the user's market may be presented to the user 106 through the user interface 126, a customer support center, an IVRS, or any other information delivery platform known in the art. Alternatively, the information may be utilized by other system components for further processing. FIG. 6 illustrates exemplary serviceability information for television services at a given address. As recited previously, this information may be ranked based on services believed most desirable to consumers by a system operator, etc.

Figure 16:
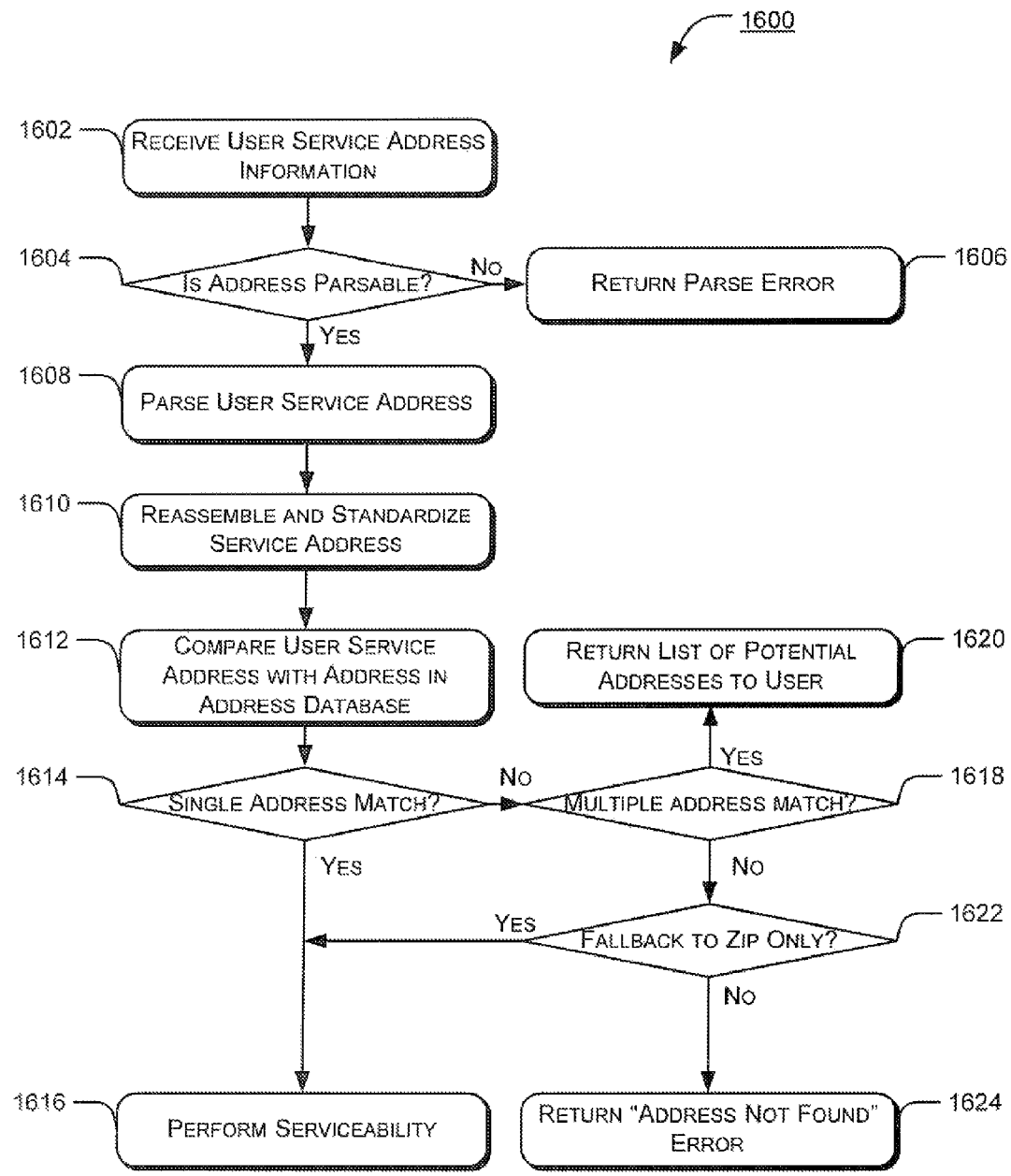
FIG. 16 is a flowchart illustrating an exemplary method for verifying service address information according to an embodiment of the present system.

FIG. 16 is a flowchart illustrating an exemplary process 1600 for identifying and verifying service address information. The method begins at step 1602, where the service address information is received. As described previously and in relation to step 1502, the service address may be obtained from the user 106 directly, or from a database, such as the customer information database 116, or from some other external information source.

At step 1604, the system determines whether the service address is parsable. Parsing is a process of breaking up a text input into individual text blocks or segments to determine the text's syntax. If for some reason the service address is not parsable (e.g., address includes no spaces between words, unusual symbols, etc.), the parser 1004 sends an error message back to the user 106 stating that an error has occurred and requests that the user 106 input the address again (step 1606). However, if the address is parsable (yes path from step 1604), at step 1608, the parser 1004 breaks down the address string into individual blocks to determine which entered address text refers to which address element. In some embodiments, address parsing may be necessary because the address database 122 stores address data in a certain format. In these embodiment, in order to verify an address, the input address should be turned into a recognizable format first.

As described previously, users 106 may not enter addresses in a recognizable format. For example, some users may enter the complete state name, while others may enter the two-letter state abbreviations. Further, some users may enter the street address before the city address, while others may enter the city address before the street or house number. Moreover, users 106 may enter address information with typos, spelling errors, incorrect zip codes, and so on, which should be corrected before the address can be verified. Further, in some instances, users may enter names in the address lines, province information may be inserted in locality fields, or the address input may be completely unstructured or inaccurate. The variety of possible abbreviations further makes the task even more complex. In order to format the input service address, the parser 1004 identifies address elements in completely unstructured or partly structured addresses and distributes the elements into the correct address elements. This step is carried out before the actual validation takes place to considerably increase correct results.

It will be understood that any known address parsing technique may be utilized without departing from the scope of the present disclosure. One method of parsing may separate or parse the input address by looking for certain separator keywords. For example, a number token may be considered as separator between the "name" element and the "street" element. Further, street designators such as "St", "Ave", "Blvd", "Street", or "Road" may signal the end of the "street" element. The state names may also be considered keywords, and so on.

Sometimes, addresses or portions of addresses may be spelled or listed incorrectly. For example, the misspelled "street" in "123 main streeet" may not be recognized as a street element because it is misspelled. Thus, according to one embodiment, the parser 1004 stores common misspellings or variants in the names of common address elements to assist in recognizing misspelled or mis-entered information. For example, it may be understood (e.g., through common knowledge, or pattern recognition of repeated mis-entries in the facilitation system 100, etc.) that a common misspelling of "Atlanta" is "Altanta". Thus, the parser 1004 may stored predefined address variants to recognize when a misspelling has occurred. In this way, the parser 1004 can perform spelling corrections on city names. For example, "pitttsberg" is automatically corrected to "Pittsburgh". Correcting known mistakes leads to more efficient address processing and furthers address standardization techniques.

Still referring to FIG. 16, once the address is parsed, it is reassembled and standardized according to a predefined format (step 1610). Specifically, in one embodiment, the standardizer 1006 restructures and reassembles the various identified address elements into a set format to obtain a standardized service address.

Next, at step 1612, the standardized address is compared with addresses in an address database, such as an external data repository (e.g., USPS database), or an internal database of pre-stored addresses. The service address is formatted to match the format of the addresses stored in the address database 122 (and/or external database, depending on the particular embodiment).

At decision block 1614, the process 1600 verifies whether a single address was returned during step 1612, or whether multiple potential address matches were identified. If only a single match was found, the method proceeds to step 1616 (yes path from step 1614) and serviceability is performed on the verified address (i.e., the address is utilized within the serviceability process 1500 at step 1506).

If an exact match is not retrieved (no path from 1614) the method moves to step 1618 to determine if multiple similar addresses with less than 100% match are obtained. According to the shown embodiment, if the address verification module 1008 determines that multiple similar addresses exist for the service address (e.g., slight change in house number, missing number, transposed apartment number, etc.) (yes path from step 1618), the method proceeds to step 1620 and a list of potential addresses are returned to the user 106. Here, the user 106 may select any potential address as the exact address or inform the serviceability engine 132 that none of the potential addresses is the exact address. If any potential address is selected as the actual service address, the method proceeds to step 1616 and serviceability is performed; else, the user 106 is requested to enter the service address again.

If no matching or similar address is retrieved from step 1612 (no path from step 1618), the serviceability engine 132 determines whether it should conduct the serviceability analysis based solely on the user's zip code. According to one embodiment, the serviceability engine 132 may ask the user 106 if the user wishes to proceed based solely on the zip code. As will be understood, however, proceeding on zip code (or other geographic indicator) alone may produce inaccurate results for the user's specific address. Alternatively, rather than proceeding on a found geographic identifier alone, the system returns an "address not found" message to the user (step 1624), at which point the user can re-enter the address, try to determine why the address is not being recognized, etc.

Described herein is a system or method that determines particular product and service plans offered by particular product and service providers at a particular geographic location based on disparate sources of information. Specifically, and according to one embodiment, the system includes operative connections to service provider systems and other external data sources (e.g., tax records, U.S. Postal Service database, census data, user-entered data) that enables the system to identify products and services available to a given geographic location based on specifics associated with the service providers (e.g., only provides service in Atlanta), capability requirements associated with the products and services (e.g., requires recycling pickup service), and capabilities available at the given geographic location (e.g., existing satellite connection). The system also parses and normalizes disparate address information to enable efficient processing of that information and accurate retrieval of available products and services. Further, the system stores all relevant information, and provides output information to an end user, or to other systems and processes for further product and service ordering, optimization, management, and other similar uses.

Systems and methods disclosed herein may be implemented in digital electronic circuitry, in computer hardware, firmware, software, or in combinations of them. Apparatuses of the claimed invention(s) can be implemented in a computer program product tangibly embodied in a machine-readable storage device for execution by a programmable processor. Method steps according to the claimed invention(s) can be performed by a programmable processor executing a program of instructions to perform functions of the claimed invention(s) by operating based on input data, and by generating output data. The claimed invention(s) may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present inventions is defined by the appended claims rather than the foregoing description and the exemplary embodiments described therein.

What is claimed is:

1. A computer implemented method for identifying products and services available at a geographic location, wherein a plurality of service providers offer a plurality of services to users at a plurality of geographic locations, and wherein one or more steps of the computer implemented method are performed via a computer processor, the method comprising the steps of:
    receiving location information corresponding to a particular geographic location associated with a user, wherein the particular geographic location is associated with a specific property at the particular geographic location;
    identifying one or more services offered by one or more service providers to the particular geographic location based on the location information corresponding to the particular geographic location;
    receiving service information associated with the one or more services offered to the particular geographic location by the one or more service providers, the service information including capabilities required information indicative of physical capabilities required by properties to effectuate the one or more services at geographic locations;
    receiving capabilities available information at the computer processor from one or more electronic databases corresponding to pre-existing physical capabilities of the specific property at the particular geographic location for receiving the one or more services offered to the particular geographic location;
    comparing, via the computer processor, the received capabilities required information of the one or more services to the received capabilities available information of the specific property at the particular geographic location to identify a subset of the one or more services that includes capabilities required information that matches capabilities available information of the specific property at the particular geographic location; and
    generating serviceability information comprising information related to the identified subset of the one or more services capable of being offered to the particular geographic location associated with the user,
    whereby the serviceability information is used to assist the user in ordering services for the specific property at the particular geographic location associated with the user.

2. The computer implemented method of claim 1, wherein the location information is selected from the group comprising: a house number, apartment number, street name, cardinal direction, zip code, city, state, province, county, country.

3. The computer implemented method of claim 1, further comprising the steps of:
    parsing the location information corresponding to the particular geographic location associated with the user into discrete elements; and
    reassembling the discrete elements into a standardized geographic location based on a standardized format.

4. The computer implemented method of claim 3, further comprising the step of comparing the standardized geographic location against known address information in a verification database to verify the standardized geographic location.

5. The computer implemented method of claim 1, wherein the step of identifying one or more services offered by one or more service providers to the particular geographic location further comprises the steps of:
    defining one or more markets corresponding to services offered in the markets; and
    identifying a particular market associated with the particular geographic location based on at least one address element included in the location information.

6. The computer implemented method of claim 5, wherein the one or more markets are defined based on geographic areas in which the one or more services are offered.

7. The computer implemented method of claim 5, wherein the one or more markets are defined based on the service information associated with the one or more services.

8. The computer implemented method of claim 1, wherein the service information is retrieved from pre-stored information in an electronic database.

9. The computer implemented method of claim 1, wherein the one or more electronic databases are associated with one or more of the following: the one or more service providers, pre-stored information in an address database, real estate sources, city plans blueprints, census data, city authorities, tax records.

10. The computer implemented method of claim 1, wherein the capabilities required information indicative of physical capabilities required by properties to effectuate the one or more services at me geographic locations is selected from the group comprising: cable connection required, satellite dish required, security system required, telephone line required, water line required, connected to sewer system required, gas connection required, DSL connection required, on recycling pickup route.

11. The computer implemented method of claim 1, wherein the capabilities available information corresponding to pre-existing physical capabilities of the specific property at the particular geographic location is selected from the group comprising: cable connection available, satellite dish available, security system available, telephone line available, water line available, connected to sewer system, gas connection available, DSL connection available, on recycling pickup route, modem available, septic system present.

12. The computer implemented method of claim 1, wherein the one or more services offered by the one or more service providers to the geographic location are selected from the group comprising: electricity, natural gas, satellite television, cable television, wireless telephone, landline telephone, Internet, home security, home insurance, home warranty, newspaper delivery, recycling pickup, home cleaning service, moving service, dry-cleaning, trash pickup, pest control.

13. The computer implemented method of claim 1, wherein the serviceability information is displayed to the user via a user interface, printed in a printed report, or stored in an electronic database for further processing.

14. A computer implemented method for providing serviceability information identifying products and services available at a geographic location to a user, wherein one or more steps of the computer implemented method are performed via a computer processor, the method comprising:
    receiving location information corresponding to a particular geographic location associated with a user, wherein the particular geographic location is associated with a specific property at the particular geographic location;
    verifying the location information;
    determining one or more services offered by service providers and available in a predefined market segment based on the location information;
    retrieving service information regarding the one or more services offered by the service providers, the service information including capabilities required information indicative of physical capabilities required by properties to effectuate the one or more services at geographic locations;
    retrieving capabilities available information at the computer processor from an electronic database for the particular geographic location indicative of physical capabilities of the specific property at the particular geographic location for receiving the one or more services at the particular geographic location; and
    displaying a list of services available at the particular geographic location based on analysis via the computer processor of available services offered by service providers and a match between the capabilities required information for the one or more services in the market segment and the capabilities available information of the specific property at the particular geographic location associated with the user.

15. The computer implemented method of claim 14, further comprising parsing the location information to obtain individual address elements corresponding to preconfigured address elements from the location information corresponding to the particular geographic location associated with the user.

16. The computer implemented method of claim 15, further comprising normalizing the individual address elements to obtain a standardized address.

17. The computer implemented method of claim 14, wherein the verifying step further comprises returning a list of near matches to the user if the location information provided by the user does not completely match with any address in an address database.

18. The computer implemented method of claim 14, wherein the verifying step further comprises returning an error message to the user if the location information provided by the user does not significantly match with any address in an address database.

19. The computer implemented method of claim 14, wherein the step of retrieving service information further comprises retrieving service information regarding the services offered by the service providers from a cached database of service information provided by service providers.

20. The computer implemented method of claim 14, wherein the location information is selected from the group comprising: a house number, apartment number, street name, cardinal direction, zip code, city, state, province, county, country.

21. The computer implemented method of claim 14, wherein the service information regarding the one or more services offered by service providers may be determined in real time.

22. A system for providing serviceability information identifying products and services available at a geographic location, wherein a plurality of service providers offer one or more services to users at a plurality of geographic locations, the system comprising:
    an electronic database for storing (a) location information corresponding to geographic locations associated with users, (b) service information associated with the one or more services offered to geographic locations by the plurality of service providers, the service information including capabilities required information indicative of physical capabilities required by properties to effectuate the one or more services at the geographic locations associated with users, and (c) capabilities available information corresponding to pre-existing physical capabilities of properties at the geographic locations for receiving the one or more services;
    a processer cummunicably coupled to the electronic database, wherein the processer is configured to:
        receive particular location information corresponding to a particular geographic location associated with a user, wherein the particular geographic location is associated with a specific property at the particular geographic location;
        verify the particular location information corresponding to the particular geographic location associated with the user;
        determine one or more services available in a predefined market segment based on the particular location information corresponding to the particular geographic location associated with the user;
        retrieve from the electronic database service information regarding the one or more services offered by service providers, including the capabilities required information for the determined one or more services;
        retrieve from the electronic database capabilities available information corresponding to pre-existing physical capabilities of the specific property at the particular geographic location for accepting the one or more services at the particular geographic location; and
        display a list of services available at the particular geographic location based on an analysis of services offered by the service providers and a match between the capabilities required information for the one or more services in the market segment and the capabilities available information of the specific property at the particular geographic location associated with the user.

23. The system of claim 22, wherein the processor is further configured to parse the particular location information to obtain individual address elements corresponding to preconfigured address parameters from the particular location information corresponding to the particular geographic location associated with the user.

24. The system of claim 23, wherein the processor is further configured to normalize the individual address elements to obtain a standardized address.

25. The system of claim 22, wherein the processor is further configured to return a list of near matches relating to the particular geographic location if the particular location information does not completely match with any address in the electronic database.

26. The system of claim 22, wherein the processor is further configured to return an error message if the particular location information does not significantly match with any address in the electronic database.

27. The system of claim 22, wherein the electronic database receives capabilities available information from one or more electronic databases in real time.

28. The system of claim 27, wherein the one or more electronic databases are associated with one or more of the following: the one or more service providers, pre-stored information in the one or more electronic databases, real estate sources, city plans blueprints, census data, city authorities, tax records.

29. The system of claim 22, wherein the particular location information is selected from the group comprising: a house number, apartment number, street name, cardinal direction, zip code, city, state, province, county, country.

30. The system of claim 22 wherein the location information stored in the electronic database is received from one or more of the following: users, the one or more service providers, pre-stored information in an address database, real estate sources, city plans blueprints, census data, city authorities, tax records.

31. The system of claim 22, wherein the predefined market segment depends on one or more of the following factors: geographic areas in which the one or more services are offered by the service providers, the service information associated with the service providers.

32. The computer implemented method of claim 22, wherein the service information regarding the one or more services offered by the service providers is determined in real time.

33. A computer implemented method for identifying services offered by service providers and available at geographic locations associated with users, wherein one or more steps of the computer implemented method are performed via a computer processor, the method comprising:
  receiving location information corresponding to a particular geographic location associated with a user, wherein the particular geographic location is associated with a specific property at the particular geographic location;
  receiving service information associated with one or more services offered by service providers, the service information including capabilities required information indicative of capabilities required by properties to effectuate the one or more services at geographic locations;
  receiving capabilities available information at the computer processor from one or more electronic databases corresponding to pre-existing physical capabilities of the specific property at the particular geographic location for accepting the one or more services offered to the particular geographic location;
  comparing, via the computer processor, the received capabilities available information and the service information associated with the one or more services including the capabilities required information to identify one or more specific services from the one or more services in a manner such that the capabilities required information matches with the capabilities available information of the specific property at the particular geographic location; and
  generating serviceability information related to the identified one or more specific services at the particular geographic location associated with the user.

34. The method of claim 33, wherein the one or more electronic databases is selected from the group comprising: the service providers, pre-stored information in an address database, real estate sources, city plans blueprints, census data, city authorities, tax records.

35. The method of claim 33, wherein the location information is received from one or more of the following: the user, the service providers, pre-stored information in an address database, real estate sources, city plans blueprints, census data, city authorities, tax records.

36. A computer implemented method for identifying services offered by service providers and available at geographic locations associated with users, wherein one or more steps of the computer implemented method are performed via a computer processor, the method comprising:
  receiving location information corresponding to a particular geographic location associated with a user, wherein the particular geographic location is associated with a specific property at the particular geographic location;
  receiving capabilities required information associated with one or more services offered by service providers, the capabilities required information indicative of physical capabilities required by properties to effectuate the one or more services;
  receiving capabilities available information at the computer processor from one or more electronic databases corresponding to pre-existing physical capabilities of the specific property at the particular geographic location for accepting the one or more services offered to the particular geographic location;
  generating, via the computer processor, serviceability information relating to a subset of the one or more services applicable to the specific property at the particular geographic location associated with the user by comparing the received capabilities available information and the received capabilities required information associated with the one or more services.

* * * * *